United States Patent
Kang et al.

(10) Patent No.: US 9,955,449 B2
(45) Date of Patent: Apr. 24, 2018

(54) METHOD AND APPARATUS FOR DETECTING THE LOCATIONS OF TERMINALS IN A MULTINODE SYSTEM

(75) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 664 days.

(21) Appl. No.: 14/343,744

(22) PCT Filed: Sep. 7, 2012

(86) PCT No.: PCT/KR2012/007209
§ 371 (c)(1),
(2), (4) Date: Mar. 27, 2014

(87) PCT Pub. No.: WO2013/036060
PCT Pub. Date: Mar. 14, 2013

(65) Prior Publication Data
US 2014/0295883 A1    Oct. 2, 2014

Related U.S. Application Data

(60) Provisional application No. 61/532,568, filed on Sep. 9, 2011.

(51) Int. Cl.
*H04W 64/00* (2009.01)
*G01S 5/02* (2010.01)
*G01S 5/10* (2006.01)
*H04B 7/06* (2006.01)

(52) U.S. Cl.
CPC ............... *H04W 64/00* (2013.01); *G01S 5/02* (2013.01); *G01S 5/10* (2013.01); *H04B 7/068* (2013.01); *H04B 7/0684* (2013.01)

(58) Field of Classification Search
CPC ............. H04B 7/068; G01S 5/02; G01S 5/10
See application file for complete search history.

(56) References Cited

U.S. PATENT DOCUMENTS

| | | | |
|---|---|---|---|
| 2008/0316042 A1* | 12/2008 | Scales ..................... | G01S 19/21 340/686.1 |
| 2010/0232543 A1* | 9/2010 | Sampath ................. | G01S 1/042 375/295 |
| 2010/0317351 A1* | 12/2010 | Gerstenberger ........ | H04W 8/26 455/443 |

(Continued)

FOREIGN PATENT DOCUMENTS

| | | |
|---|---|---|
| EP | 2 237 583 A1 | 10/2010 |
| KR | 10-2009-0112337 A | 10/2009 |
| KR | 10-2011-0090961 A | 8/2011 |

*Primary Examiner* — Qun Shen

(74) *Attorney, Agent, or Firm* — Birch, Stewart, Kolasch & Birch, LLP

(57) ABSTRACT

Provided are a method and an apparatus for detecting the locations of terminals in a multi-node system. A plurality of nodes transmit location reference signals which are distinguished by node, and a terminal performs feedback of channel information on each node using the location reference signals. Various signaling for detecting the locations of the terminals may be performed for each node, that is, for each point, rather than cell-based signaling.

6 Claims, 14 Drawing Sheets

(56) References Cited

U.S. PATENT DOCUMENTS

| | | | |
|---|---|---|---|
| 2011/0039574 A1* | 2/2011 | Charbit | G01S 5/0215 455/456.1 |
| 2011/0105144 A1* | 5/2011 | Siomina | G01S 5/0215 455/456.1 |
| 2011/0124347 A1* | 5/2011 | Chen | H04W 64/00 455/456.1 |
| 2011/0143773 A1* | 6/2011 | Kangas | G01S 5/02 455/456.1 |
| 2011/0176499 A1* | 7/2011 | Siomina | G01S 1/042 370/329 |
| 2011/0206011 A1 | 8/2011 | Ishida et al. | |
| 2012/0165037 A1* | 6/2012 | Bull | G01S 5/0205 455/456.1 |
| 2012/0208523 A1* | 8/2012 | Hans | H04W 64/00 455/422.1 |
| 2012/0231809 A1* | 9/2012 | Siomina | H04W 64/00 455/456.1 |
| 2012/0294162 A1* | 11/2012 | Pajukoski | H04B 7/024 370/252 |
| 2012/0307670 A1* | 12/2012 | Kazmi | H04W 24/10 370/252 |
| 2013/0010619 A1* | 1/2013 | Fong | H04W 74/002 370/252 |
| 2013/0028204 A1* | 1/2013 | Dinan | H04W 72/0453 370/329 |
| 2013/0051317 A1* | 2/2013 | Ji | H04W 24/02 370/328 |
| 2013/0182583 A1* | 7/2013 | Siomina | H04W 24/10 370/252 |

* cited by examiner

METHOD AND APPARATUS FOR DETECTING THE LOCATIONS OF TERMINALS IN A MULTINODE SYSTEM

CROSS REFERENCE TO RELATED APPLICATIONS

This application is the National Phase of PCT/KR2012/007209 filed on Sep. 7, 2012, which claims priority under 35 U.S.C. 119(e) to U.S. Provisional Application No. 61/532,568 filed on Sep. 9, 2011, all of which are incorporated by reference herein in its entirety.

BACKGROUND OF THE INVENTION

Field of the Invention

The present invention concerns wireless communications, and more specifically, to methods and apparatuses of detecting the location of a terminal in a multi-node system.

Related Art

The amount of data transferred over a wireless communication network is recently increasing very quickly. One reason may be attributed to the introduction and use of various devices including smartphones or tablet PCs requiring machine-to-machine (M2M) communication and high data transfer. To meet the demand for high data transfer, more attention is drawn to carrier aggregation and cognitive ratio technology that enable efficient use of more frequency bands and multi-antenna technique or multi-base station cooperation technique for boosting data capacity in a limited frequency.

Further, wireless communication networks evolve to have more density of nodes to which uses may have access. Here, the term "nodes" sometimes refers to antennas spaced apart from each other at a certain distance in a distributed antenna system (DAS) but is not limited thereto and may rather have a broader concept. In other words, a node may be a pico cell base station (PeNB), a home base station (HeNB), an RRH (Remote Radio Head), an RRU (Remote Radio Unit), or a relay station. The node may also be referred to as a point.

Such wireless communication system with high node density may show higher system capacity through inter-node cooperation. That is, when nodes are managed by a single control station for their transmission and reception to be operated as if they are a single antenna or antenna group, much better system performance can be achieved rather than when they each serve as an independent base station (BS), advanced BS (ABS), node-B (NB), eNode-B (eNB), or access point (AP). Hereinafter, a wireless communication system including a plurality of nodes is referred to as a multi-node system.

In a multi-node system, a plurality of nodes are distributed, and thus, which node a terminal is in communication with may be critical depending on the location of the terminal. For this, grasping the location of the terminal matters. A method for grasping where a terminal is located is to use a PRS (positioning reference signal) in a conventional wireless communication system. According to existing communication standards in relation with the PRS, a sequence is generated based on a physical cell ID (identifier), and is mapped with a radio resource.

Meanwhile, the existing multi-node systems assume use of one cell ID by multiple nodes. Accordingly, per the existing communication standards, a plurality of nodes should use the same physical cell ID when sending a PRS. In such case, a terminal might not be aware of which node has sent the PRS. Further, a base station may have difficulty in exactly grasping the position of the terminal from a result of measuring the PRS, which is fed back from the terminal.

SUMMARY OF THE INVENTION

A method and apparatus of detecting the location of a terminal in a multi-node system are provided.

In an aspect, there is provided a method of operating a terminal for positioning the terminal in a multi-node system including a base station and a plurality of nodes wiredly connected with the base station. The method comprises receiving a reference signal generated based on a global point identifier (GPI) from each of the plurality of nodes; generating channel information on each of the plurality of nodes by measuring the reference signal; and transmitting the channel information to the base station, wherein the base station and the plurality of nodes have the same physical cell ID, wherein the physical cell ID is a cell ID indicated by a synchronization signal transferred from the base station and the plurality of nodes, wherein the global point ID is an ID distinctly assigned to each of the plurality of nodes and is used to generate a sequence used for the reference signal, and is provided in addition to the physical cell ID.

In another aspect, there is provided a method of positioning a terminal in a multi-node system including a base station and a plurality of nodes wiredly connected with the base station. The method comprises assigning global point IDs to the plurality of nodes, the global point IDs used to send a positioning reference signal used for grasping a location of the terminal; sending the positioning reference signal using a corresponding global point ID in each of the plurality of nodes; receiving channel information measured using the positioning reference signal from the terminal; and estimating the location of the terminal based on the channel information, wherein the base station and the plurality of nodes have the same physical cell ID, wherein the physical cell ID is a cell ID indicated by a synchronization signal transferred from the base station and the plurality of nodes and is used for a cell-specific reference signal (CRS) provided to a plurality of terminals including the terminal, and wherein the global point ID is configured as a distinct value for each of the plurality of nodes and is used to send the positioning reference signal instead of the physical cell ID.

In still another aspect, there is provided a method of operating a terminal for positioning the terminal in a multi-node system including a base station and a plurality of nodes wiredly connected with the base station. The method comprises receiving a reference signal generated based on a different physical cell ID (PCI) from each of the plurality of nodes; generating channel information on each of the plurality of nodes by measuring the reference signal; and transmitting the channel information to the base station, wherein each of the plurality of nodes has a first PCI that is the same physical cell ID as the base station and a second PCI that is distinct from the first PCI, and wherein the second PCI is used only for resource mapping and a sequence of the reference signal.

In yet still another aspect, there is provided a method of operating a terminal for positioning the terminal in a multi-node system including a base station and a plurality of nodes wiredly connected with the base station. The method comprises receiving a distinct reference signal from each of the plurality of nodes; generating channel information on each of the plurality of nodes by measuring the reference signal; and transmitting the channel information to the base station, wherein the reference signal received from each of the plurality of nodes uses a sequence generated based on the same physical cell ID as the base station and is mapped with a different time and frequency resource.

In yet still another aspect, there is provided a terminal operating in a multi-node system including a base station and a plurality of nodes wiredly connected with the base station. The terminal comprises an RF unit transmitting and receiving a radio signal; and a processor connected with the RF unit, wherein the processor receives a reference signal generated based on a global point ID (GPI) from each of the plurality of nodes, generates channel information on each of the plurality of nodes by measuring the reference signal, and transmitting the channel information to the base station, wherein the base station and the plurality of nodes have the same physical cell ID, wherein the physical cell ID is a cell ID indicated by a synchronization signal transferred from the base station and the plurality of nodes, wherein the global point ID is an ID distinctly assigned to each of the plurality of nodes and is used to generate a sequence used for the reference signal, and is provided in addition to the physical cell ID.

In a multi-node system, each node may send a reference signal that is distinct from a reference signal from another node. A terminal may perform measurement used for positioning the terminal using a distinct reference signal and may feed a result of the measurement back to a base station. As a result, the base station may locate the terminal and assign a proper node to the terminal, thus leading to enhancement in system performance.

DESCRIPTION OF EXEMPLARY EMBODIMENTS

The layers of a radio interface protocol between a terminal and a network may be separated into a first layer Layer 1, a second layer Layer 2, and a third layer Layer 3 based on lower three layers of the well-known open system interconnection (OSI) model. The first layer is the physical (PHY) layer. The second layer may be split into the MAC (Medium Access Control) layer, the RLC (Radio Link Control) layer and PDCP (Packet Data Convergence Protocol) layer. The third layer is the RRC (Radio Resource Control) layer. The physical layer provides an information transfer service using a physical channel, and the radio resource control (hereinafter, "RRC") layer positioned in the third layer serves to control radio resources between the terminal and the network. For this purposes, the RRC layer exchanges RRC messages between the terminal and the network.

Figure 1:
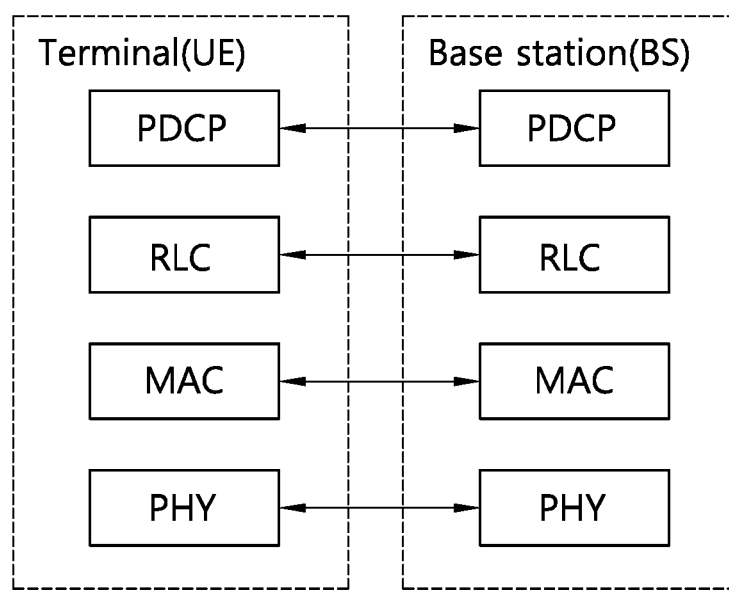
FIG. 1 is a block diagram illustrating a radio protocol architecture for a user plane.
Figure 2:
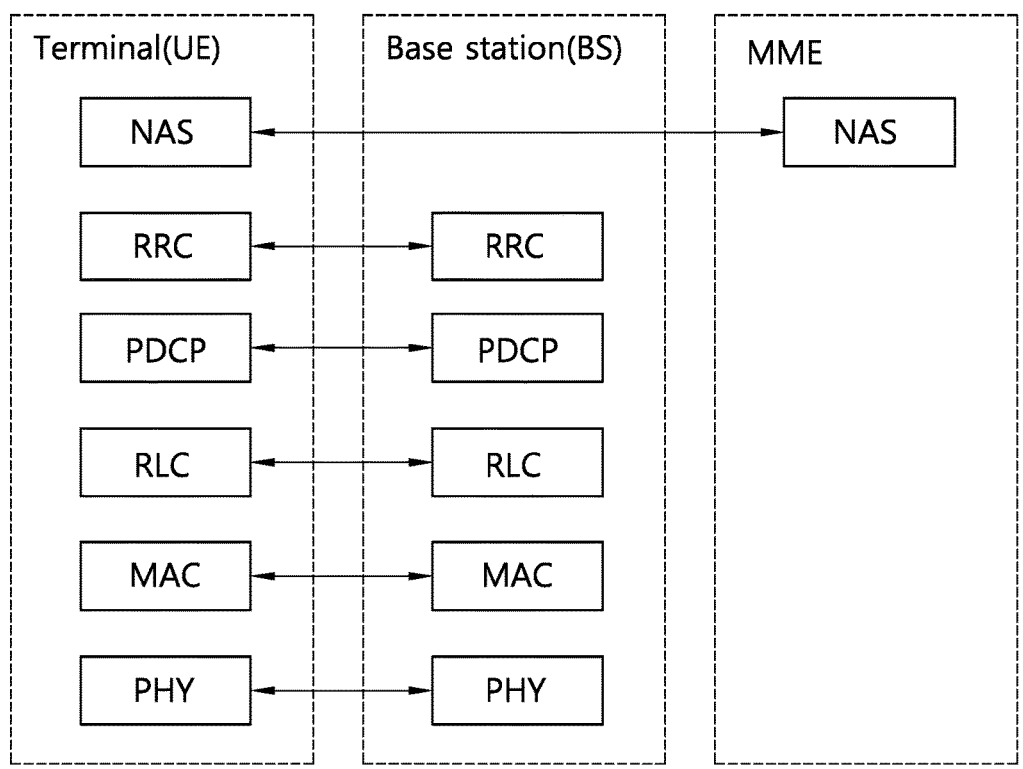
FIG. 2 is a block diagram illustrating a radio protocol architecture for a control plane.

FIG. 1 is a block diagram illustrating a radio protocol architecture for a user plane. FIG. 2 is a block diagram illustrating a radio protocol architecture for a control plane. This represents the structure of a radio interface protocol between a terminal and an E-UTRAN (Evolved UMTS Terrestrial Radio Access Network). The user plane is a protocol stack for user data transfer and the control plane is a protocol stack for control signal transfer. In general, the protocol stack means multiple layers for data processing.

Referring to FIGS. 1 and 2, data is transferred through a physical channel between different physical layers, i.e., between a physical layer on a transmission side and a physical layer on a reception side. The physical layer is connected with an upper MAC layer via a transport channel. Data is delivered through the transfer channel between the MAC layer and the physical layer. The physical layer provides an information transfer service to the MAC layer and an higher layer using the transfer channel.

The MAC layer offers a service to an RLC layer, an higher layer, via a logical channel. The RLC layer supports reliable data transfer. The PDCP layer provides a header compression function that reduces the header size of an IP packet.

The RRC layer is defined only in the control plane. The RRC layer plays a role to control radio resources between the terminal and the network. For this, the RRC layer exchanges RRC messages between the terminal and the network. The RRC layer is associated with configuration, re-configuration, and release of radio bearers and is in charge of controlling logical channels, transfer channels, and physical channels. The radio bearer means a service offered by the second layer for data transfer between the terminal and the E-UTRAN. In case there is an RRC connection between the terminal's RRC and the network's RRC, the terminal comes to be in an RRC connected mode, and otherwise, in an RC idle mode.

An MME conducts the following functions. (1) NAS (Non-Access Stratum) signaling, (2) NAS signaling security, (3) Idle mode UE reachability, (4) Tracking area list management, (5) Roaming, and (6) Authentication.

The NAC (Non-Access Stratum) layer, located over the RRC layer, carries out functions such as session management and mobility management.

Figure 3:
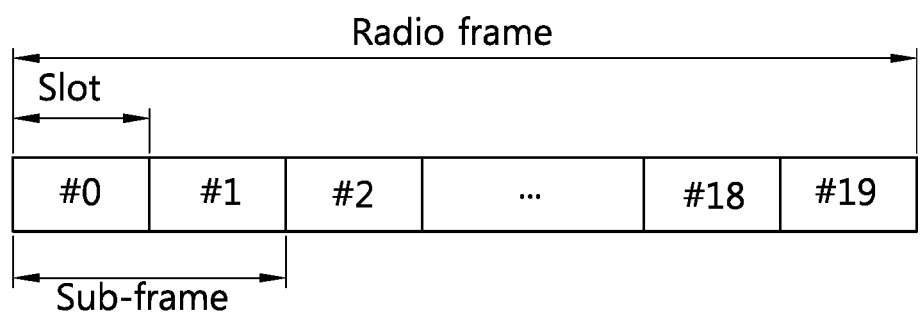
FIG. 3 shows the architecture of a radio frame in 3GPP ($3^{rd}$ Generation Partnership Project) LTE (Long Term Evolution).

FIG. 3 shows the architecture of a radio frame in 3GPP ($3^{rd}$ Generation Partnership Project) LTE (Long Term Evolution).

Referring to FIG. 3, a radio frame includes 10 subframes, and one subframe is defined by two consecutive slots. The time taken for one subframe to be transferred is TTI (transmission time interval). The radio frame has a temporal length $T_f=307200*T_s=10$ ms and consists of 20 slots. The slots each have a temporal length $T_{slot}=15360*T_s=0.5$ ms and are numbered 0 to 19.

In a radio frame, one slot includes a plurality of OFDM (orthogonal frequency division multiplexing) symbols in the time domain and a plurality of resource blocks (RBs) in the frequency domain. The OFDM (orthogonal frequency division multiplexing) symbol is a term to represent one symbol period since 3GPP LTE adopts OFDMA (orthogonal frequency division multiple access) on downlink, and may be also referred to by other terms such as SC-FDMA (single carrier-frequency division multiple access) symbol depending on multiple access schemes. The resource block is a basis for resource allocation and includes, in one slot, a plurality of consecutive sub-carriers. The architecture of a radio frame is merely an example, and the number of subframes included in the radio frame or the number of slots included in a subframe, and the number of OFDM symbols included in a slot may change in various ways.

Figure 4:
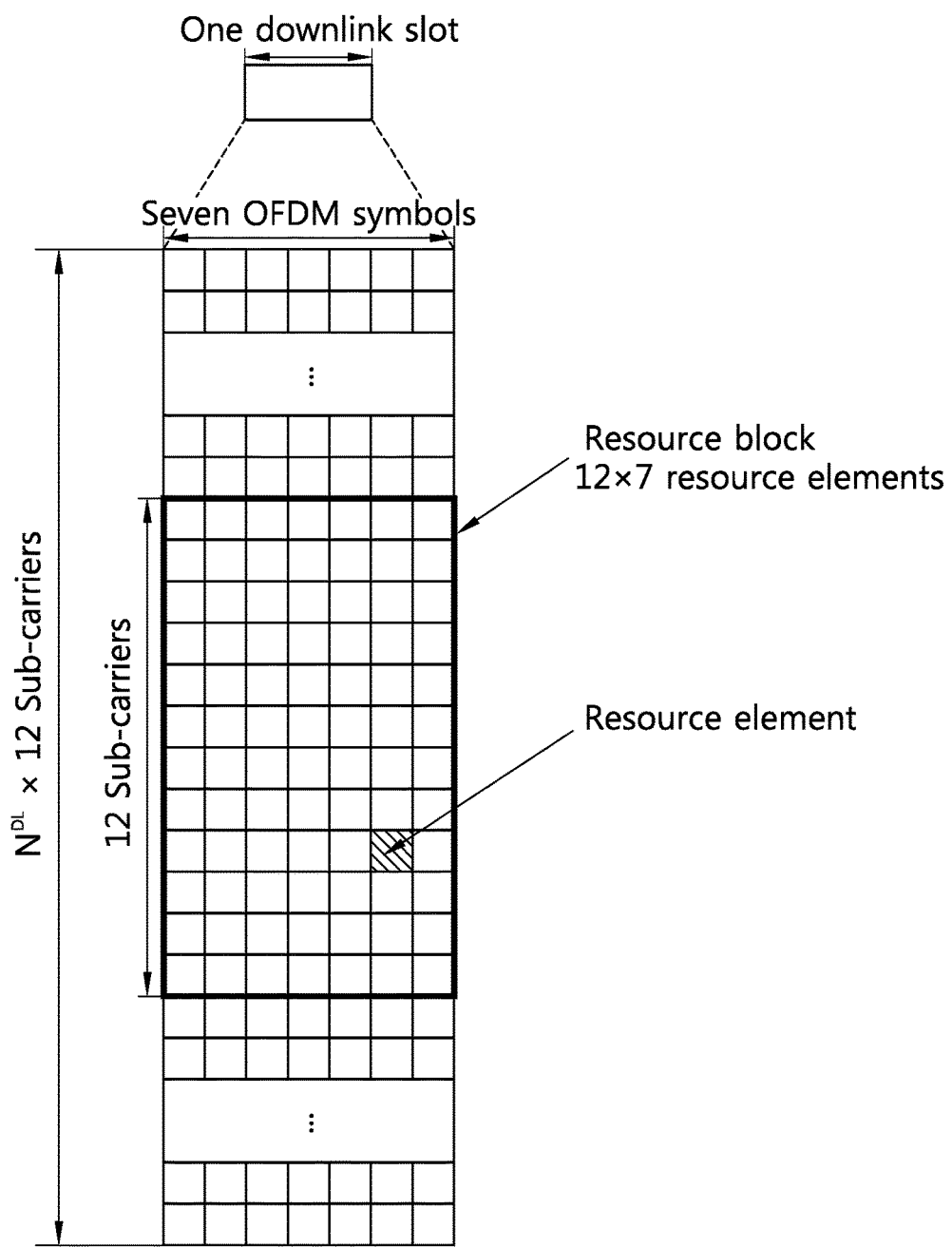
FIG. 4 is a view illustrating an example resource grid for one downlink slot.

FIG. 4 is a view illustrating an example resource grid for one downlink slot.

Referring to FIG. 4, one downlink slot includes, in the time domain, a plurality of OFDM symbols. Here, one downlink slot includes seven OFDM symbols, and one resource block (RB) includes, in the frequency domain, 12 sub-carriers, but embodiments of this disclosure are not limited thereto.

Each element over the resource grid is called resource element (RE), and one resource block includes 12×7 resource elements. The number of $N^{DL}$ of resource blocks included in the downlink slot depends upon the downlink transfer bandwidth set in a cell. The above-described resource grid for downlink slot may also apply to an uplink slot.

Figure 5:
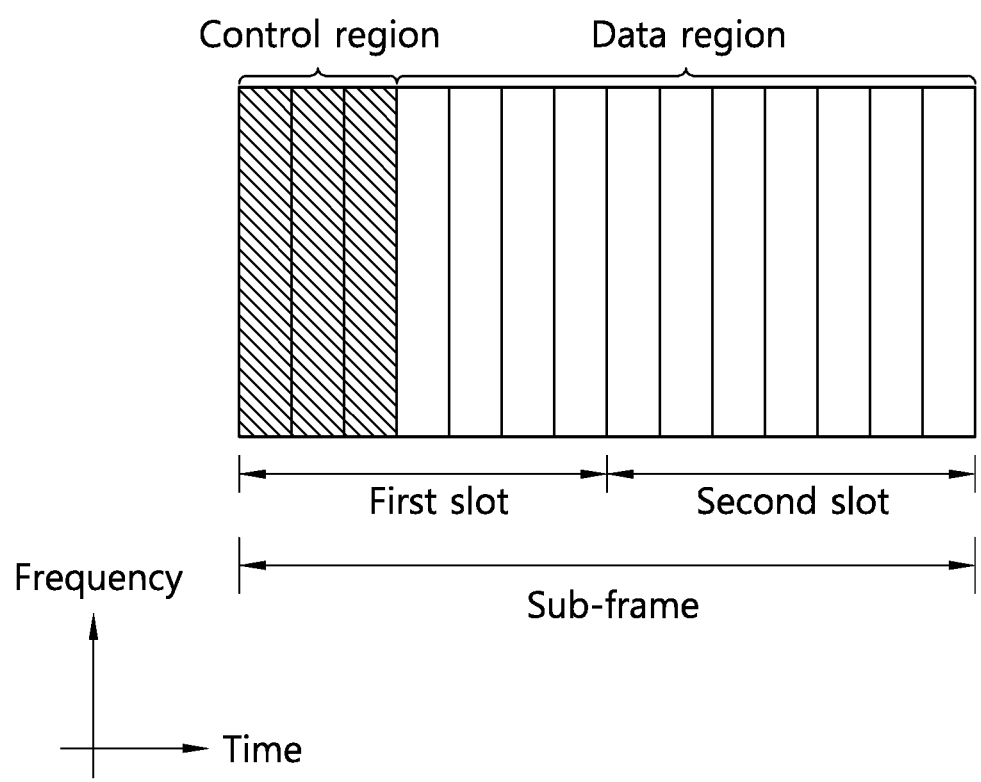
FIG. 5 shows an example architecture of a downlink subframe.

FIG. 5 shows an example architecture of a downlink subframe.

Referring to FIG. 5, a subframe includes two consecutive slots. The first up to 3 OFDM symbols (in some cases, four OFDM symbols) of the first slot in the subframe are a control region where downlink control channels are assigned, and the remaining OFDM symbols may be a data region where a PDSCH (Physical Downlink Shared Channel) is assigned.

The downlink control channels include a PCFICH (Physical Control Format Indicator Channel), a PDCCH (Physical Downlink Control Channel), and a PHICH (Physical Hybrid-ARQ Indicator Channel). The PCFICH sent in the first OFDM symbol of the subframe carries information on the number of OFDM symbols (i.e., size of the control region) used for transmission of control channels in the subframe. The control information sent through the PDCCH is referred to as downlink control information (DCI). The DCI indicates uplink resource allocation information, downlink resource allocation information and an uplink transmit power control command for some user equipment (UE) groups.

The PHICH carries an ACK (Acknowledgement)/NACK (Non-Acknowledgement) signal for an HARQ (Hybrid Automatic Repeat Request) of uplink data. That is, the ACK/NACK signal for uplink data sent by the terminal is transmitted by the base station over the PHICH.

The PDSCH is a channel where control information and/or data is transmitted. The terminal may read data transmitted through the PDSCH by decoding the control information sent through the PDCCH.

Figure 6:
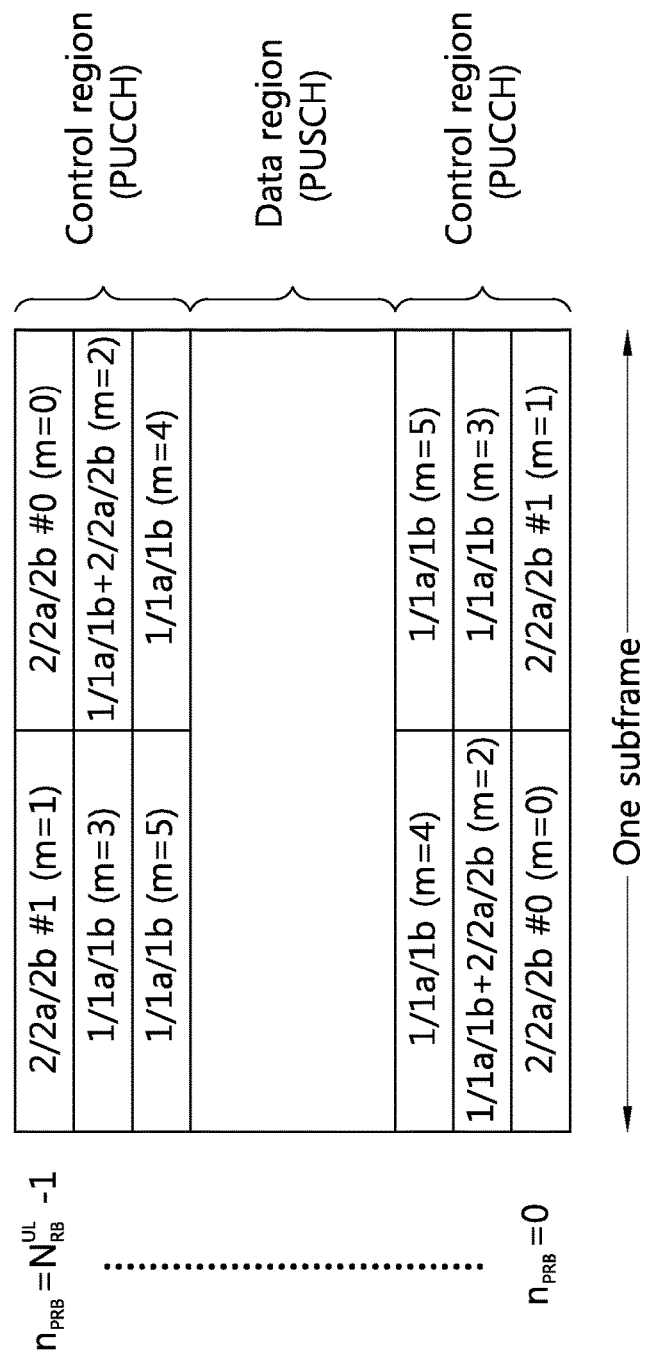
FIG. 6 shows the architecture of an uplink subframe.

FIG. 6 shows the architecture of an uplink subframe.

The uplink subframe may be separated in a control region and a data region in the frequency domain. A PUCCH (Physical Uplink Control Channel) is assigned to the control region to transfer uplink control information (UCI). A PUSCH (Physical Uplink Shared Channel) is assigned to the data region to transfer uplink data and/or uplink control information. In such sense, the control region may be referred to as PUCCH region, and the data region may be referred to as PUSCH region. Depending on the configuration information indicated by a higher layer (for example, RRC layer), the terminal may support simultaneous transmission of the PUSCH and PUCCH or might not support simultaneous transmission of the PUSCH and PUCCH.

The PUSCH is mapped with a UL-SCH (Uplink Shared Channel), a transport channel. The uplink data transferred over the PUSCH may be a transport block that is a data block for the UL-SCH transmitted during the TTI. The transport block may be user information. Or, the uplink data may be multiplexed data. The multiplexed data may be the one obtained by multiplexing a transport block for UL-SCH and uplink control information. For example, the uplink control information multiplexed with uplink data may include a CQI (channel quality indicator), a PMI (Precoding Matrix Indicator), an HARQ (hybrid automatic repeat request) ACK/NACK (acknowledgement/not-acknowledgement), an RI (Rank Indicator), and a PTI (precoding type indication). As such, the uplink control information being transmitted together with uplink data in the data region is referred to as UCI's piggyback transmission. On the PUSCH may be transmitted only the uplink control information.

A PUCCH with respect to one terminal is assigned with a resource block (RB) pair in a subframe. The resource blocks in the RB pair take up different sub-carriers, respectively, in the first and second slots, respectively. The frequencies occupied by the resource blocks in the RB pair assigned to the PUCCH vary with respect to a slot boundary. This is referred to as the RB pair assigned to the PUCCH being frequency-hopped at the slot boundary. The terminal may obtain a frequency diversity gain by sending uplink control information through different sub-carriers over time.

The PUCCH carries various types of control information according to its formats. PUCCH format 1 delivers a scheduling request (SR). At this time, an OOK (On-Off Keying) scheme may apply. PUCCH format 1a transfers an ACK/NACK (Acknowledgement/Non-Acknowledgement) modulated in a BPSK (Binary Phase Shift Keying) scheme with respect to one codeword. PUCCH format 1b carries an ACK/NACK modulated in a QPSK (Quadrature Phase Shift Keying) scheme with respect to two codewords. PUCCH format 2 carries a CQI (Channel Quality Indicator) modulated in a QPSK scheme. PUCCH formats 2a and 2b carry a CQI and an ACK/NACK. PUCCH format 3 is modulated in a QPSK scheme and may deliver a plurality of ACKs/NACKs and SRs.

Each PUCCH format is transmitted mapped with a PUCCH region. For example, PUCCH formats 2/2a/2b are mapped with resource blocks (m=0, 1 in FIG. 6) at the band boundary assigned to the terminal and are then transferred. A mixed PUCCH resource block (RB) may be sent, mapped with a resource block (e.g., m=2) adjacent to the resource blocks assigned with PUCCH formats 2/2a/2b towards the center of the band. PUCCH formats 1/1a/1b where an SR and an ACK/NACK are transferred may be arranged at the resource blocks (m=4 or m=5). The number ($N^{(2)}_{RB}$) of resource blocks available in PUCCH formats 2/2a/2b where a CQI is transferred may be informed to the terminal through a broadcast signal.

Meanwhile, various reference signals may be delivered in the subframe. The reference signals may include a CRS (cell-specific reference signal), a CSI-RS (channel status information reference signal), and a PRS (positioning reference signal).

The CRS may be received by all the terminals in a cell and is transferred over a whole dl band. The RS sequence $r_{l,n_s}(m)$ for the CRS may be defined as follows:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, N_{RB}^{max,DL} - 1$$

Here, m=0, 1, ..., $2N^{max,DL}_{RB}-1$, $N^{max,DL}_{RB}$ is the maximum number of RBs, $n_s$ is a slot number in the radio frame, l is an OFDM symbol number in the slot.

Pseudo-random sequence) c(i) in Equation 1 may be defined by a gold sequence whose length is 31 as follows:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 2]}$$

Here, Nc=1600, and the first m-sequence is initialized as $x_1(0)=1$, $x_1(n)=0$, m=1, 2, ..., 30. The second m-sequence is initialized as $c_{init}=2^{10}(7(n_s+1)+l+1)(2N^{cell}_{ID}+1)+2N^{cell}_{ID}+N_{CP}$ at the beginning of each OFDM symbol. Here, $N^{cell}_{ID}$ is a physical cell identity (PCI) of the cell, where in normal CP, $N_{CP}=1$, and in extended CP, $N_{CP}=0$. As described in connection with Equations 1 and 2, the CRS sequence is generated based on the physical cell ID of the cell.

The CSI-RS (channel status information reference signal) may be used separately or together with the CRS for channel estimation on the PDSCH.

The CSI-RS has up to 32 different configurations so as to reduce inter-cell interference (ICI) in the multi-cell environment including a heterogeneous network environment, unlike the CRS.

The CSI-RS has different configurations depending on the number of antennas in the cell and is given to have most different configurations between adjacent cells. The CSI-RS is distinguished depending on CP (cyclic prefix) types, and according to frame architecture types (e.g., frame architecture type 1 is an FDD frame, and frame architecture type 2 is a TDD frame), is separated into a configuration that applies to both frame architecture type 1 and frame architecture type 2 and a configuration that applies only to frame architecture type 2.

The CSI-RS, unlike the CRS, supports up to eight antennas, and antenna port p is supported for {15}, {15, 16}, {15, 16, 17, 18}, {15, ..., 22}. In other words, one, two, four, and eight antenna ports are backed up. The inter-sub-carrier gap Δf is defined only for 15 kHz.

The sequence $r_{l,n_s}(m)$ for the CSI-RS is generated as follows:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$
$$m = 0, \ldots, N_{RB}^{max,DL} - 1$$

where, $$c_{init} = 2^{10} \cdot (7 \cdot (n_s+1) + l + 1) \cdot (2 \cdot N^{cell}_{ID} + 1) + 2 \cdot N^{cell}_{ID} + N_{CP}$$

$$N_{CP} = \begin{cases} 1 & \text{for normal } CP \\ 0 & \text{for extended } CP \end{cases}$$

In Equation 3 above, $n_s$ is a slot number in the radio frame, and l is an OFDM symbol number in the slot. c(i) is a pseudo random sequence and is started with $c_{init}$ shown in Equation 3 from each OFDM symbol. $N_{ID}^{cell}$ means a physical cell ID. That is, even for the existing CSI-RS, a sequence is generated based on a physical cell ID.

In the subframes configured to send a CSI-RS, the reference signal sequence $r_{l,n_s}(m)$ is mapped with a complex number modulation symbol $a_{k,l}^{(p)}$ that is used as a reference symbol for antenna port p.

$r_{l,n_s}(m)$ and $a_{k,l}(P)$ has the following relationship:

$$a_{k,l}^{(p)} = w_{l''} \cdot r(m) \quad \text{[Equation 4]}$$

where, $k = k' + 12m +$ $$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$l'' = 0, 1$ $m = 0, 1, \ldots, N_{RB}^{DL} - 1$ $$m' = m + \left\lfloor \frac{N_{RB}^{max,DL} - N_{RB}^{DL}}{2} \right\rfloor$$

In Equation 4 above, (k', l') and $n_s$ are given in Tables 1 and 2 to be described below. The CSI_RS may be sent in a downlink slot where ($n_s$ mod 2) meets the conditions shown in Tables 1 and 2 that are described below (Here, mod means a modular operation. That is, ($n_s$ mod 2) means the remainder when $n_s$ is divided by 2.

The following table represents CSI-RS configurations for normal CP:

TABLE 1

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

The following table represents CSI-RS configurations for extended CP:

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2  0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

A subframe including a CSI-RS should satisfy the following equation:

$$(10n_f + \lfloor n_s/2 \rfloor - \Delta_{CSI-RS}) \bmod T_{CSI-RS} = 0 \quad \text{[Equation 5]}$$

In Equation 5, $n_f$ is a system frame number.

Further, a CSI-RS may be sent in a subframe satisfying the conditions in Table 3.

The following table, Table 3, represents CSI-RS subframe configurations related with duty cycles.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

In Table 3 above, 'CSI-RS-SubframeConfig,' i.e., $I_{CSI-RS}$, is a value given by an higher layer and represents a CSI-RS subframe configuration. $T_{CSI-RS}$ refers to a cell-specific subframe configuration period, and $\Delta_{CSI-RS}$ refers to a cell-specific subframe offset. A CSI-RS supports five duty cycles depending on CQI/CSI feedback, and may be transmitted with a different subframe offset in each cell.

Figure 7:
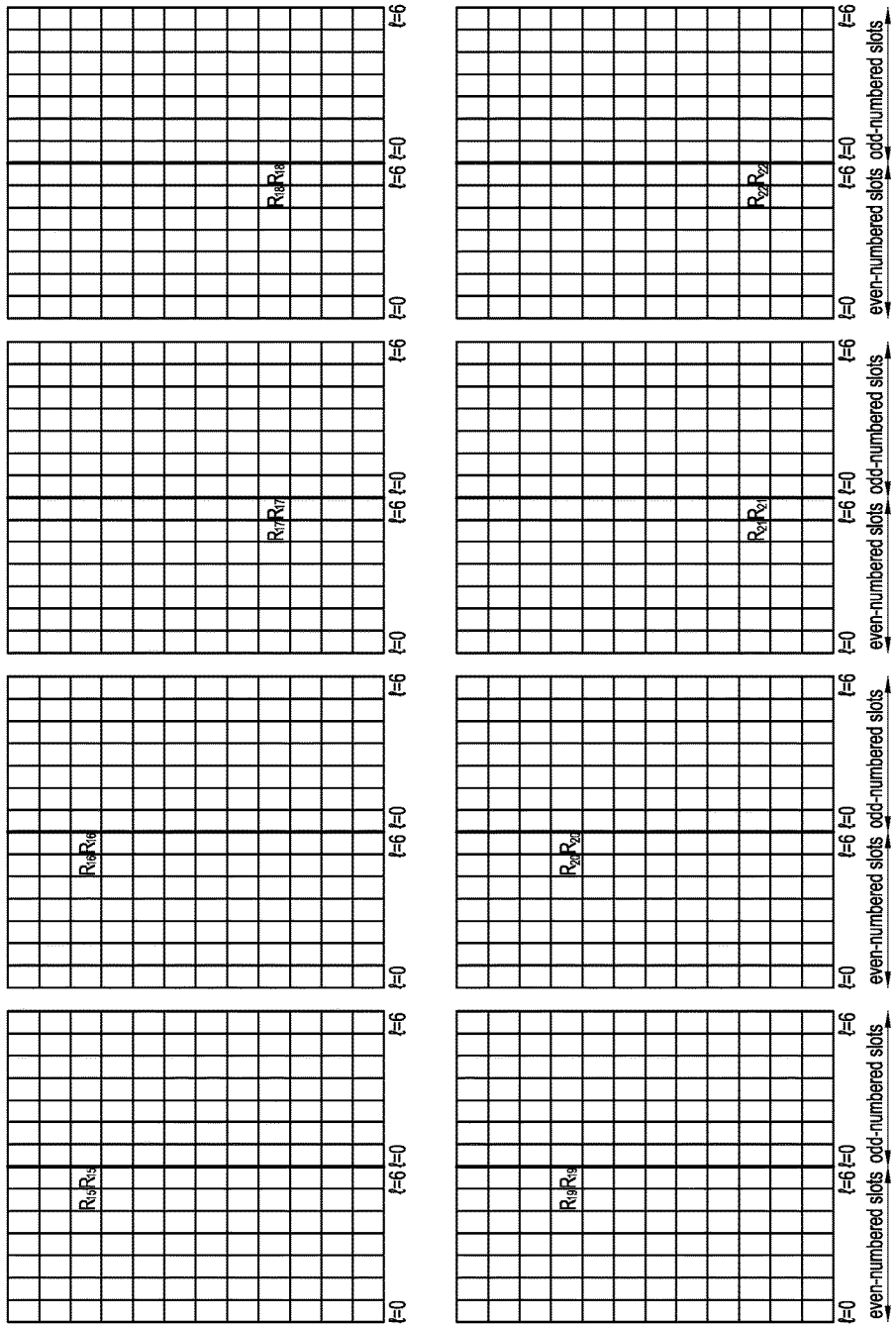
FIG. 7 shows CSI-RS mapping for CSI-RS configuration 0 in normal CP.

FIG. 7 shows CSI-RS mapping for CSI-RS configuration 0 in normal CP.

Referring to FIG. 7, a CSI-RS is transmitted using two consecutive resource elements that are the same for two antenna ports, for example, p={15, 16}, {17, 18}, {19, 20}, {21, 22} and using an OCC (orthogonal cover code). Each CSI-RS is assigned having a specific pattern in a radio resource region depending on CSI-RS configurations. In such sense, the CSI-RS is also referred to as a CSI-RS pattern.

A plurality of CSI-RS configurations are available in a given cell, and the base station may configure the terminal to have none or one or more of a CSI-RS configuration assuming non-zero transport power or a CSI-RS configuration assuming zero transport power.

No CSI-RS is sent in the following cases:
1. Special subframe of frame architecture type 2
2. when colliding with sync signal, PBCH, or SIB
3. Subframe where paging message is sent A resource element (k,l) used for transmission of a CSI-RS for some antenna port in set S is not used for transmission of a PDSCH for some antenna port in the same slot. Further, the resource element (k,l) is not used for CSI-RS transmission for some other antenna port except for the set S in the same slot. Here, the antenna ports included in set S are {15, 16}, {17, 18}, {19, 20}, and {21, 22}.

The parameters necessary for the above-described CSI-RS transmission include 1. CSI-RS port number, 2. CSI-RS control information, 3. CSI-RS subframe configuration ($I_{CSI-RS}$), 4. Subframe configuration period ($T_{CSI-RS}$), and 5. Subframe offset $\Delta_{CSI-RS}$, and these parameters are cell-specific and given by higher layer signaling.

Now, a PRS (positioning reference signal) is described.

The PRS is a reference signal used for positioning a terminal. The PRS is transmitted only in the resource blocks configured for PRS transmission in the downlink subframe. The downlink subframe where the PRS is sent is referred to as a positioning subframe. If in a cell a normal subframe and an MBSFN (multicast-broadcast single frequency network) subframe both are set as positioning subframes, the OFDM symbols in the MBSFN subframe come to use the same CP as the CP (cyclic prefix) used in subframe #0. If in the cell only the MBSFN subframe is set as a positioning subframe, the extended CP is used for the OFDM symbols configured for PRS transmission in the MBSFN subframe. In the subframe where PRS transmission is configured, the start position of the OFDM symbols configured for PRS transmission is the same as the start position in the subframe where all the OFDM symbols have the same CP length as the OFDM symbols assigned with PRS transmission. The PRS is transferred through antenna port 6. Further, the PRS is not mapped with a resource element where a PBCH, a PSS (primary synchronization signal), or an SSS secondary synchronization signal) is assigned.

The following sequence may be used for the PRS.

$$r_{l,n_s}(m) = \frac{1}{\sqrt{2}}(1-2 \cdot c(2m)) + j\frac{1}{\sqrt{2}}(1-2 \cdot c(2m+1)),$$ [Equation 6]

$$m = 0, 1, \ldots, 2N_{RB}^{max,DL}-1$$

In the above equation, $n_s$ is a slot number in the radio frame, and l is an OFDM symbol number in the slot. c(i) is initialized at the beginning of each OFDM symbol as follows:

$$c_{init}=2^{10} \cdot (7 \cdot (n_s+1)+l+1) \cdot (2 \cdot N_{ID}^{cell}+1)+2 \cdot N_{ID}^{cell}+N_{CP}$$ [Equation 7]

$N_{CP}$ is 1 for normal CP and 0 for extended CP.

The reference signal sequence $r_{l,n_s}(m)$ is mapped with a complex value modulation symbol $a^{(p)}_{k,l}$ used as a reference signal for antenna port 6 in slot $n_s$, as follows:

$$a_{k,l}^{(p)}=r_{l,n_s}(m')$$ [Equation 8]

for normal CP(Normal cyclic prefix):

$$k = 6(m + N_{RB}^{DL} - N_{RB}^{PRS}) + (6-l+v_{shift}) \bmod 6$$

$$l = \begin{cases} 3, 5, 6 & \text{if } n_s\bmod 2 = 0 \\ 1, 2, 3, 5, 6 & \text{if } n_s\bmod 2 = 1 \text{ and} \\ & (1 \text{ or } 2 \text{ PBCH antenna ports}) \\ 2, 3, 5, 6 & \text{if } n_s\bmod 2 = 1 \text{ and} \\ & (4 \text{ PBCH antenna ports}) \end{cases}$$

$$m = 0, 1, \ldots, 2 \cdot N_{RB}^{PRS}-1$$

$$m' = m + N_{RB}^{max,DL} - N_{RB}^{PRS}$$

for extended CP(Extended cyclic prefix):

$$k = 6(m + N_{RB}^{DL} - N_{RB}^{PRS}) + (5-l+v_{shift}) \bmod 6$$

$$l = \begin{cases} 4, 5 & \text{if } n_s\bmod 2 = 0 \\ 1, 2, 4, 5 & \text{if } n_s\bmod 2 = 1 \text{ and} \\ & (1 \text{ or } 2 \text{ PBCH antenna ports}) \\ 2, 4, 5 & \text{if } n_s\bmod 2 = 1 \text{ and} \\ & (4 \text{ PBCH antenna ports}) \end{cases}$$

$$m = 0, 1, \ldots, 2 \cdot N_{RB}^{PRS}-1$$

$$m' = m + N_{RB}^{max,DL} - N_{RB}^{PRS}$$

The band and $N^{PRS}_{RB}$ of the PRS are configured by a higher layer signal, and a cell-specific frequency shift $v_{shift}$ is given $N^{cell}_{ID} \bmod 6$. That is, it can be seen that in the existing PRS a sequence is generated based on the cell's physical cell ID and is mapped with a radio resource.

The cell-specific subframe configuration period $T_{PRS}$ and cell-specific subframe offset $\Delta_{PRS}$ for PRS transmission may be determined as in the following table by a PRS configuration index $I_{PRS}$ that is given by a higher layer signal.

TABLE 4

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |

TABLE 4-continued

| PRS configuration Index $I_{PRS}$ | PRS periodicity $T_{PRS}$ (subframes) | PRS subframe offset $\Delta_{PRS}$ (subframes) |
| --- | --- | --- |
| 480-1119 | 640 | $I_{PRS}$-480 |
| 1120-2399 | 1280 | $I_{PRS}$-1120 |
| 2400-4095 | Reserved | |

The PRS is transferred only in configured downlink subframes. Further, the PRS is not sent in a special subframe of a TDD frame. The PRS may be delivered in $N_{PRS}$ consecutive downlink subframes, where $N_{PRS}$ is configured by a higher layer signal.

Among the $N_{PRS}$ consecutive downlink subframes, the first subframe may meet the following equation:

$$(10 \times n_f + \lfloor n_s/2 \rfloor - \Delta_{PRS}) \bmod T_{PRS}=0$$ [Equation 9]

Figure 8:
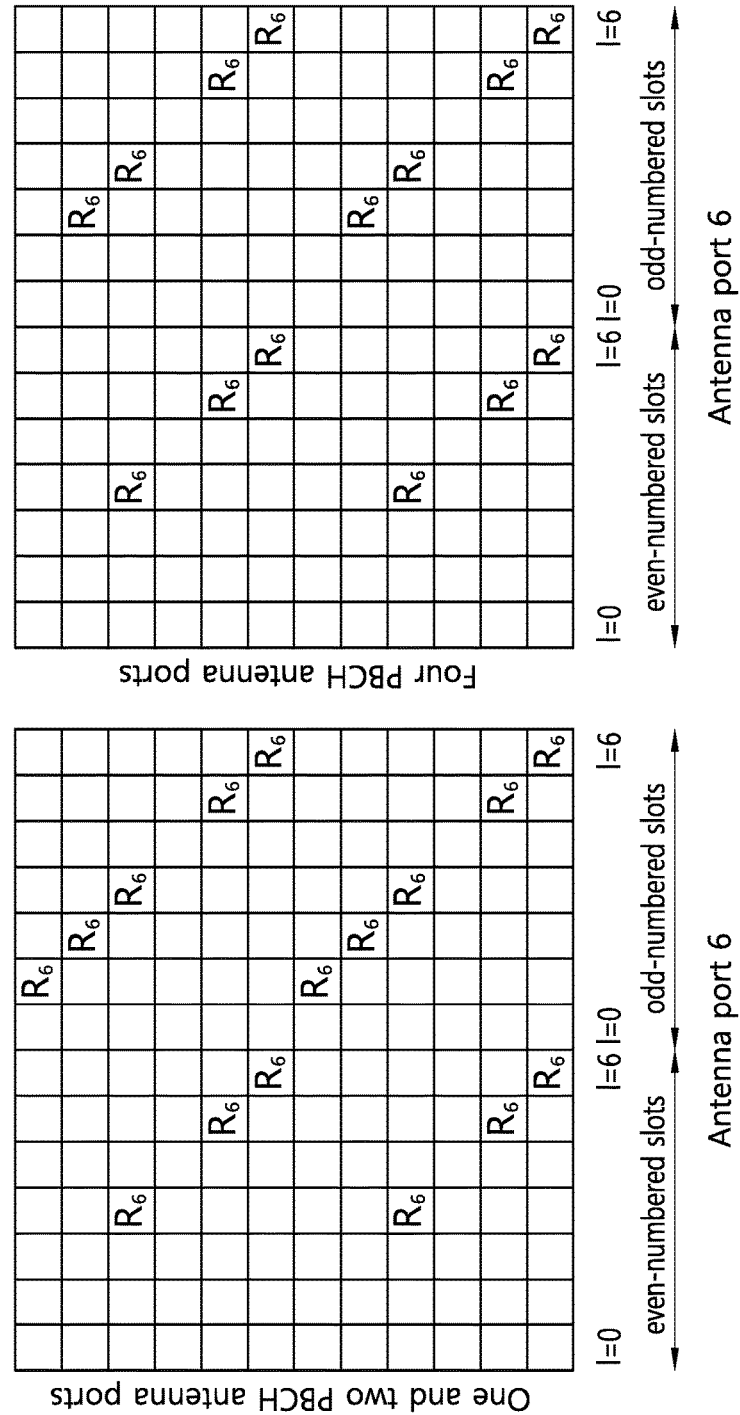
FIG. 8 shows an example of mapping of a PRS in a subframe in normal CP.
Figure 9:
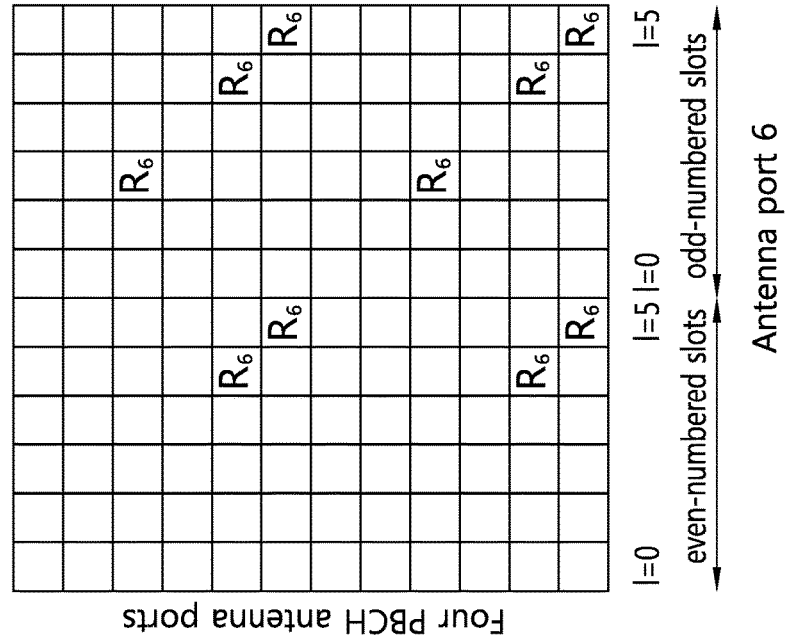
FIG. 9 shows an example of mapping of a PRS in a subframe in extended CP.
Figure 9:
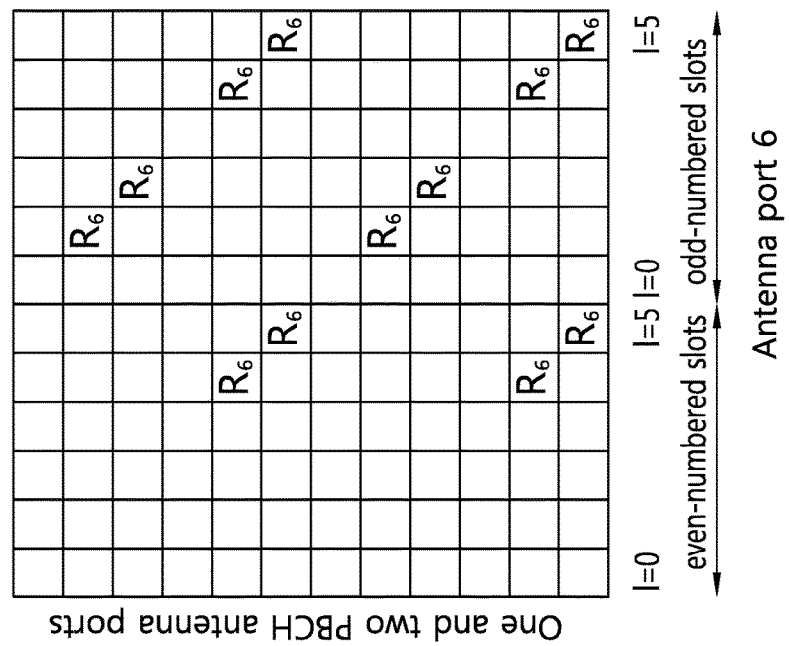

FIG. 8 shows an example of mapping of a PRS in a subframe in normal CP, and FIG. 9 shows an example of mapping of a PRS in a subframe in extended CP.

Various reference signals have been described thus far. As described earlier, a reference signal sequence is generated based on a physical cell ID, and reference signals are mapped with resource elements and then are transmitted.

A method of detecting a location of a terminal is now described.

A wireless communication system, for example, an LTE system, may locate a terminal by conducting measurement in various ways, as follows:

1. Cell ID-Based Positioning

A system may grasp an approximate location of a terminal through a cell ID of a cell linked with the terminal. This method has advantages such as low cost, no need of update, and protection of privacy and does not require changes in the existing communication standards. In contrast, positioning accuracy is low, as a shortcoming.

2. A-GNSS (Global Navigation Satellite Systems)

This method locates a terminal using a satellite such as GPS (global positioning system), Galileo, or GLONASS. This method shows high positioning accuracy, but suffers from high manufacturing costs and complexity of terminals and inability to use in indoor environments.

3. E-CID (Enhanced-Cell ID) Positioning

This method reports a signal strength measured by a terminal (for example, RSRP, RSRQ, etc.) and a result of measuring a difference in time between reception and transmission by the terminal to a base station so as to raise accuracy of the positioning scheme, thereby positioning the terminal.

4. UTDOA (Uplink Timing Difference of Arrival)

This method adopts a terminal's uplink signal (for example, SRS (sounding reference signal), VoIP (voice over Internet protocol), PUSCH) and grasps the location of the terminal using a time difference between the times when an uplink signal reaches the nodes.

5. OTDOA (Observed Time Difference of Arrival)

In this method, a terminal reports to a base station a time difference between the reference signals transferred from other cells than a reference cell so that the base station may grasp the location of the terminal. At this time, a PRS (positioning reference signal) may be used as the reference signal, but is not limited thereto. Other downlink signals, for example, a CRS, a synchronization signal, a PBCH, and a PDCCH, may also be used.

Information on the reference cell and information on neighbor cells, provided by the base station to the terminal in order for the OTDOA, may be as follows.

The information on the reference cell is an information element (IE) that is used for a location server to provide reference cell information on OTDOA auxiliary data.

1) an Example of Information on Reference Cell (OTDOA-ReferenceCellInfo)

TABLE 5

```
-- ASN1START
OTDOA-ReferenceCellInfo ::= SEQUENCE {
  physCellId        INTEGER (0 . . . 503),
  cellGlobalId      ECGI                  OPTIONAL,       -- Need ON
  earfcnRef         ARFCN-ValueEUTRA      OPTIONAL,       -- Cond NotSameAsServ0
  antennaPortConfig ENUMERATED {ports1-or-2, ports4, . . . }
                                          OPTIONAL,       -- Cond NotSameAsServ1
  cpLength          ENUMERATED { normal, extended, . . . },
  prsInfo           PRS-Info              OPTIONAL,       -- Cond PRS
  . . .
}
-- ASN1STOP
```

'physCellId' specifies the physical cell ID of the reference cell, and 'cellGlobalId' specifies a unique ID of the reference cell in the entire system. That is, 'physCellId' is chosen between 0 to 503, and thus, duplicate values may be present. In such case, ambiguity may be addressed by 'cellGlobalId.' 'earfcnRef' specifies an EARFCN of the reference cell. 'antennaPortConfig' represents which one of antenna ports 1, 2, and 4 is used for a cell-specific reference signal. 'cpLength' specifies the CP length of a reference cell PRS. 'prsInfo' specifies a PRS configuration of a reference cell.

The following table represents an example 'prsInfo.'

TABLE 6

```
-- ASN1START
PRS-Info ::= SEQUENCE {
  prs-Bandwidth         ENUMERATED { n6, n15, n25, n50,
                                     n75, n100, . . . },
  prs-ConfigurationIndex INTEGER (0 . . . 4095),
  numDL-Frames          ENUMERATED {sf-1, sf-2, sf-4, sf-6, . . .},
  . . . ,
  prs-MutingInfo-r9     CHOICE {
    po2-r9                BIT STRING (SIZE(2)),
    po4-r9                BIT STRING (SIZE(4)),
    po8-r9                BIT STRING (SIZE(8)),
    po16-r9               BIT STRING (SIZE(16)),
    . . .
```

TABLE 6-continued

```
  }                                        OPTIONAL        -- Need OP
}
-- ASN1STOP
```

'prs-Bandwidth' specifies a band that is used to configure a PRS.

'prs-ConfigurationIndex' specifies a PRS configuration index, $I_{PRS}$. 'numDL-Frames' specifies the number ($N_{PRS}$) of consecutive downlink subframes having a PRS. 'prs-MutingInfo' specifies a cell's PRS muting configuration.

Information on the reference cell is used for the location server to inform the reference cell to the terminal, and neighbor cells associated with a cell defined by the information on the reference cell are provided by information on the neighbor cells. The information on the neighbor cells provide a list that is sorted in descending order for priority in measurement that should be conducted by the terminal. In the list, the first cell has the highest priority. The terminal should conduct and offer possible measurement in the order provided by the location server.

2) an Example of Information on Neighbor Cells (OTDOA-NeighbourCellInfoList)

TABLE 7

```
-- ASN1START
OTDOA-NeighbourCellInfoList ::= SEQUENCE (SIZE (1 . . . maxFreqLayers)) OF OTDOA-
NeighbourFreqInfo
OTDOA-NeighbourFreqInfo ::= SEQUENCE (SIZE (1 . . . 24)) OF OTDOA-
NeighbourCellInfoElement
OTDOA-NeighbourCellInfoElement ::= SEQUENCE {
  physCellId             INTEGER (0 . . . 503),
  cellGlobalId           ECGI                OPTIONAL,    -- Need ON
  earfcn                 ARFCN-ValueEUTRA OPTIONAL,       -- Cond NotSameAsRef0
  cpLength               ENUMERATED { normal, extended, . . . }
                                             OPTIONAL,    -- Cond NotSameAsRef1
  prsInfo                PRS-Info            OPTIONAL,    -- Cond NotSameAsRef2
  antennaPortConfig      ENUMERATED {ports-1-or-2, ports-4, . . . }
                                             OPTIONAL,    -- Cond NotsameAsRef3
  slotNumberOffset       INTEGER(0 . . . 31)   OPTIONAL,  --Cond NotSameAsRef4
  prs-SubframeOffset     INTEGER (0 . . . 1279) OPTIONAL, --Cond InterFreq
  expectedRSTD           INTEGER (0 . . . 16383),
  expectedRSTD-Uncertainty INTEGER (0 . . . 1023),
  . . .
}
maxFreqLayers INTEGER ::= 3
-- ASN1STOP
```

'physCellId' specifies the physical cell ID of a neighbor cell, and 'cellGlobalId' specifies a unique ID of a neighbor cell in the entire system. 'earfcnRef' specifies an EARFCN of a neighbor cell. 'cpLength' specifies the CP length of a neighbor cell PRS. 'prsInfo' specifies a PRS configuration of a neighbor cell. 'antennaPortConfig' represents which one of antenna ports 1, 2, and 4 is used for a cell-specific reference signal. 'slotNumberOffset' specifies a slot number offset between a neighbor cell and a reference cell. 'prs-SubframeOffset' specifies an offset between the first PRS subframe in a reference carrier frequency layer of the reference cell and the first PRS subframe in a carrier frequency layer of another cell. 'expectedRSTD' indicates an RSTD value that is expected to be measured between a neighbor cell and a reference cell in a target device. 'expectedRSTD-Uncertainty' indicates uncertainty of an 'expectedRSTD' value.

The terminal receives information on the above-described reference cell and information on neighbor cells and reports to the base station an RSTD (reference signal time difference), RSTD quality, or reference quality. The RSTD is described below.

The following table shows an example of OTDOA signal measurement information (OTDOA-SignalMeasurementInformation) that is reported from the terminal to the base station.

Examples of physical layer measurements for positioning a terminal are described. The following examples may be fed back to a base station as channel information according to positioning methods.

1. RSRP (Reference Signal Received Power)

RSRP is defined as linear average of power contributions of resource elements that carry cell-specific reference signals in a frequency band that is a measurement target. For RSRP, resource elements (Ro) transferred through antenna port 0 are used, and if a terminal may reliably detect resource elements (R1) transferred through antenna port 1, R1 may also be added additionally.

2. RSRQ (Reference Signal Received Quality)

RSRQ is defined as NxRSRP/(E-UTRA carrier RSSI). Here, N is the number of resource blocks in an E-UTRA carrier RSSI measurement band. The E-UTRA carrier RSSI (received signal strength indicator) includes thermal interference, adjacent channel interference, and linear average of total received power measured only in the OFDM symbols including reference signals for antenna port 0 in N resource blocks that are a measurement band. If RSRQ measurement is signalled in a specific subframe through a higher layer signal, the RSSI is measured in all the OFDM symbols in the specific subframe.

3. UE Rx-Tx Time Difference

The UE Rx-Tx time difference is defined as a time obtained by subtracting the transmission timing ($T_{UE-TX}$) of

TABLE 8

```
-- ASN1START
OTDOA-SignalMeasurementInformation ::= SEQUENCE {
    systemFrameNumber              BIT STRING (SIZE (10)),
    physCellIdRef                  INTEGER (0 . . . 503),
    cellGlobalIdRef                ECGI                           OPTIONAL,
    earfcnRef                      ARFCN-ValueEUTRA               OPTIONAL,
    referenceQuality               OTDOA-MeasQuality              OPTIONAL,
    neigbourMeasurementList NeighbourMeasurementList,
    . . .
}
NeighbourMeasurementList ::= SEQUENCE (SIZE(1 . . . 24)) OF NeighbourMeasurementElement
NeighbourMeasurementElement ::= SEQUENCE {
    physCellIdNeighbor             INTEGER (0 . . . 503),
    cellGlobalIdNeighbour ECGI                                    OPTIONAL,
    earfcnNeighbour                ARFCN-ValueEUTRA    OPTIONAL,
    rstd             INTEGER (0 . . . 12711),
    rstd-Quality                   OTDOA-MeasQualty,
    . . .
}
-- ASN1STOP
```

In the above table, 'systemFrameNumber' specifies the number of the system frame that has been measured last. 'physCellIdRef' specifies the physical cell ID of a related reference cell where RSTDs are provided. 'cellGlobalIdRef' represents a unique ID (ECGI) of a related reference cell where RSTDs are provided. 'earfcnRef' specifies an E-UTRA carrier frequency of a reference cell that is used for RSTD measurement. 'referenceQuality' represents the best estimation quality of signal arrival time measurement form a reference cell which is used for calculating an RSTD value. 'neighborMeasurementList' is a list including measured RSTD values and measurement quality. 'physCellId-Neighbor' specifies the physical cell IDs of neighbour cells where RSTDs are provided. 'cellGlobalIdNeighbor' specifies the unique IDs of neighbour cells where RSTDs are provided. 'earfcnNeighbor' specifies E-UTRA carrier frequencies of neighbour cells used for RSTD measurement. 'rstd' specifies a relative time difference between a reference cell and a neighbour cell. 'rstd-Quality' specifies the best estimation of a device for the measured rstd quality.

the terminal's uplink radio frame #i from reception timing ($T_{UE-RX}$) of downlink radio frame #i from the terminal's serving cell.

4. RSTD (Reference Signal Time Difference)

The RSTD is a relative time difference between neighbor cell j and reference cell i and is defined as a difference between the time ($T_{subframeRxj}$) when the terminal receives the start of one subframe from neighbor cell j and the time ($T_{subframeRxi}$) when the terminal receives the start of a subframe closest to the subframe from neighbor cell i.

Now, a multi-node system is described.

Figure 10:
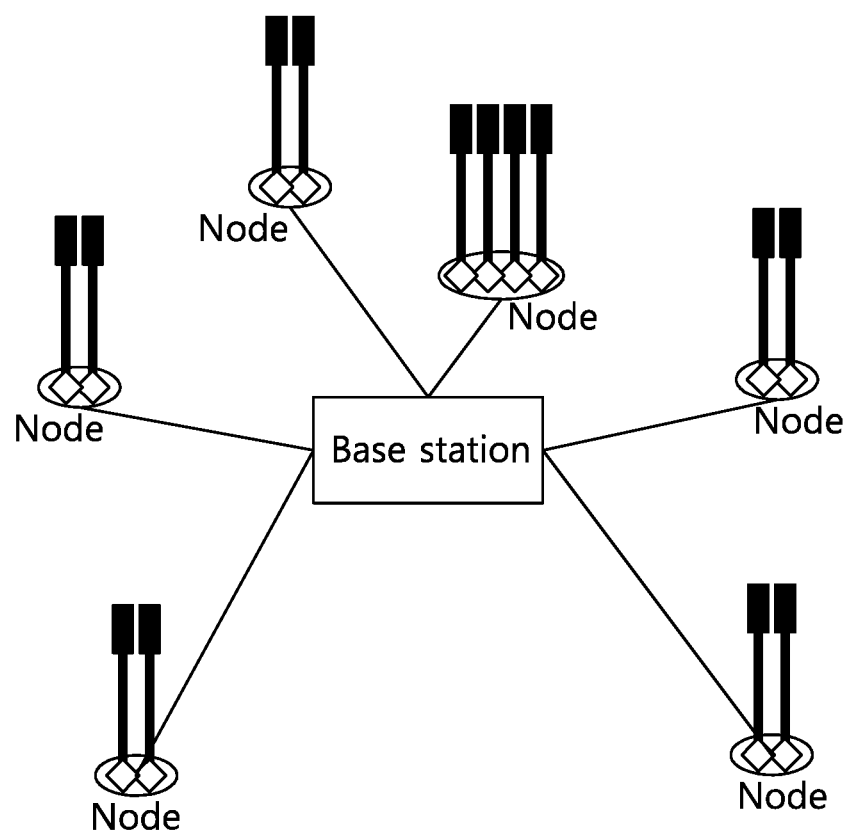
FIG. 10 shows an example multi-node system.

FIG. 10 shows an example multi-node system.

Referring to FIG. 10, the multi-node system includes a base station and a plurality of nodes.

In FIG. 10, the nodes may include a macro base station, a picocell base station (PeNB), a home base station (HeNB), an RRH (remote radio head), a relay station, and distributed antennas. Such nodes are also called points.

In the multi-node system, the base station and all the nodes are assigned the same physical cell ID, and the nodes may be managed by the base station for transmission and reception, so that an individual node can be operated as part of one cell. Such multi-node system is referred to as a single cell multi-node system. The base station is also referred to as a macro node or macro point.

Specifically, in a single cell multi-node system, channels and cell-specific signals such as a synchronization signal, a CRS, or a PBCH, are generated based on the same physical cell ID. For example, in case one macro node is connected with N RRHs via fibre optic to configure a single cell multi-node system, synchronization signals generated based one physical cell ID may be transferred from the macro node or simultaneously from all the nodes. Accordingly, in such single cell multi-node system, the existing terminal (legacy UE) might not be aware of the presence of the RRHs.

The single cell multi-node system may prevent the terminal's frequent handover and CRS and control channel (PDCCH, PHICH, PCFICH) collisions between the plurality of nodes.

However, among the above-described terminal positioning methods, the A-GNSS or UTDOA method may also apply to a single cell multi-node system but the cell ID-based positioning methods or OTDOA method is difficult to directly apply to a single cell multi-node system because the plurality of nodes may use the same physical cell ID.

Hereinafter, methods of being able to more accurately locate a terminal, which have been evolved out of the cell ID-based positioning method and OTDOA method that may be applicable to a single cell multi-node system are described.

I. Cell ID-Based Positioning Method

This method defines and uses a cell ID in addition to an existing cell ID such as a physical cell ID (PCI) or ECGI (evolved cell global identifier) for a single cell multi-node system. The additionally used cell ID is called a global point identifier (GPI) for convenience. The GPI may be defined at the level of a point rather than a cell. That is, according to an embodiment of the present invention, each and every node in a single multi-node system may be configured to have the same physical cell ID and ECGI but different GPIs.

The GPI may be a network ID that is configured by the ID of a network where a point belongs (for example, public land mobile network: PLMN) or a physical layer ID that is used at the physical layer and has a predetermined range like a PCI (from 0 to a few hundreds or thousands).

The network ID may be given a unique value in the whole system. In such case, the GPI, like the ECGI, may be defined in the network, so that adjacent nodes belonging to different cells may be configured to have different GPIs. In contrast, the GPI defined as physical layer ID, in case points are positioned far away from each other, duplication is allowable.

The GPI being a physical layer ID means that it is an ID used for a physical layer process such as sequence generation (for example, generating a sequence used for a reference signal) or resource mapping. The GPI being a network ID means that it may be an ID provided for the purpose of discerning points at a higher layer rather than being used for sequence generation or resource mapping at the physical layer.

An example of using a GPI for a single cell multi-node system is described.

Figure 11:
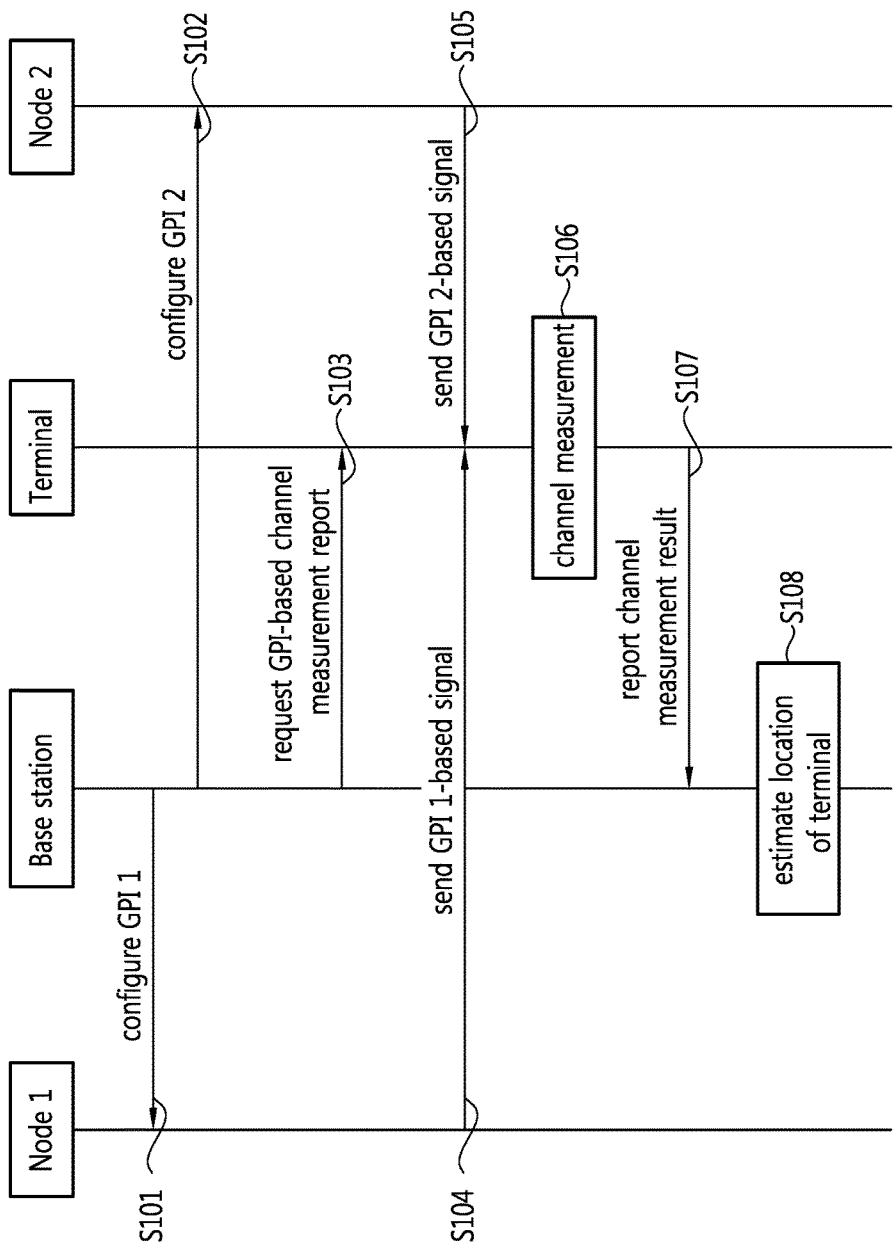
FIG. 11 shows a method of positioning a terminal according to an embodiment of the present invention.

FIG. 11 shows a method of positioning a terminal according to an embodiment of the present invention.

Referring to FIG. 11, a base station may configure GPI 1 for node 1 (S101) and GPI 2 for node 2 (S102). GPI 1 and GPI 2 are distinct from each other. Further, the base station may send a request for a GPI-based channel measurement report to a terminal (S103). For example, the base station may request that the terminal measure a synchronization signal or reference signal that is generated based on the GPI and report a result.

Node 1 may send a GPI 1-based signal (S104), and node 2 may send a GPI 2-based signal (S105). The GPI-based signal may be a reference signal (PRS), taking an example of a signal of a physical layer generated using a GPI. The terminal measures a channel with each node using GPI-based signals (S106) and reports a result of the channel measurement (S107).

The base station estimates the location of the terminal using the channel measurement result received from the terminal (S108). By such method, the location of the terminal in the single cell multi-node system may be more accurately detected because the GPI-based signal is a signal distinct for each of a plurality of nodes included in the same cell, and if the measurement result is used, it can be precisely found which node the terminal is closer to.

In the above-described process, an RSRP, RSRQ, and UE Rx-Tx time difference may be used for the terminal's channel measurement. The existing RSRP, RSRQ, and UE Rx-Tx time difference are defined based on cell-specific reference signals (CRSs), and thus, need to be varied. For example, the UE Rx-Tx time difference according to the present invention may be varied point-based but not cell-based, as follows:

TABLE 9

| Definition | UE Rx-Tx time difference may be defined as $T_{UE-RX}-T_{UE-TX}$. At this time, $T_{UE-RX}$ is the time when the terminal receives downlink radio frame #i from a serving point, and $T_{UE-TX}$ is the time when the terminal transmits uplink radio frame #i. |
|---|---|

In other words, the RSRP, RSRQ, and UE Rx-Tx time difference are measured with respect to a physical channel or physical signal which is defined not cell-specifically but point-specifically and may be provided to the base station.

In case the GPI is newly defined only in the PLMN domain and a point-specific physical channel is not explicitly newly defined in the physical channel (that is, if used as network ID), an RSRP and an RSRP may be defined using physical signals that are implicitly distinguished per point. For example, if a CSI-RS is sent in a pattern that is separated per point, an RSRP and an RSRQ may be defined based on the CSI-RS.

II. Method of Positioning a Terminal when Applying an OTDOA Method

The existing PRS is specified to use a different physical resource, i.e., time or frequency code, per cell. This PRS may be specified to use a different physical resource per point. For this, the sequence used for the PRS may be generated as shown in Equation 10, and a pseudo-random sequence may be generated as shown in one of Equations 11 to 13.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 10]}$$

$$m = 0, 1, \ldots, 2N_{RB}^{max,DL} - 1$$

In the above equation, $n_s$ is a slot number in the radio frame, and l is an OFDM symbol number in the slot. The pseudo-random sequence c(i) is defined in Equation 2. Here, the start of each OFDM symbol may be initialized as any one of Equations 11 to 13 as follows.

$$c_{init}=2^{10}\cdot(7\cdot(n_s+1)+l+1)\cdot(2\cdot N_{ID}^{point}+1)+2\cdot N_{ID}^{cell}+N_{CP} \quad \text{[Equation 11]}$$

$$c_{init}=2^{10}\cdot(7\cdot(n_s+1)+l+1)\cdot(2\cdot N_{ID}^{cell}+1)+2\cdot N_{ID}^{point}+N_{CP} \quad \text{[Equation 12]}$$

$$c_{init}=2^{10}\cdot(7\cdot(n_s+1)+l+1)\cdot(2\cdot N_{ID}^{point}+1)+2\cdot N_{ID}^{point}+N_{CP} \quad \text{[Equation 13]}$$

In Equations 11 to 13, $N_{CP}$ is 1 in normal CP and 0 in extended CP. While Equation 7 which applies to the existing PRS uses $N^{cell}_{ID}$, Equations 11 to 13 use both $N^{cell}_{ID}$ and $N^{point}_{ID}$ or $N^{point}_{ID}$ only.

$r_{l,ns}(m)$, which is a reference signal sequence for the PRS, is mapped with a complex value modulation symbol $a^{(p)}_{k,l}$ that is used as a reference signal for antenna port 6 in slot $n_s$, as shown in Equation 8. At this time, although in Equation 8 the cell-specific frequency shift $v_{shift}$ is given $N^{cell}_{ID}$ mod 6, $v_{shift}$ is given $N^{point}_{ID}$ mod 6 according to the present invention. In other words, the sequences used for PRS may be assigned to different frequency resources depending on global point ID (GPI).

As described above, different PRSs may be generated for point IDs (GPIs). In such case, control information (for example, 'OTDOA-ReferenceCellInfor', 'OTDOA-NeighborCellInfoList') provided for OTDOA from the base station, which is included in RRC signals and terminal's feedback information (for example, 'OTDOA-SignalMeasurementInformation', 'RSTD') may include an additional point ID field.

For example, the base station may inform the terminal not of a reference cell and a neighbour cell but of a reference point and a neighbour point. As an example, 'OTDOA-ReferenceCellInfo' shown in Table 5 may be changed to 'OTDOA-ReferenceCellInfo' as shown in Table 10.

TABLE 10

```
-- ASN1START
OTDOA-ReferencePointInfo ::= SEQUENCE {
    physPointId      GPI1
    pointGlobalId    GPI2              OPTIONAL,       -- Need ON
    earfcnRef        ARFCN-ValueEUTRA  OPTIONAL,       -- Cond
NotSameAsServ0
    antennaPartConfig ENUMERATED {ports1-or-2, ports4, . . . }
                                       OPTIONAL,       -- Cond
NotSameAsServ1
    cpLength         ENUMERATED { normal, extended, . . . },
    prsInfo          PRS-Info          OPTIONAL,       -- Cond PRS
    . . .
}
-- ASN1STOP
```

In Table 10 above, GPI 1 may be given as a physical layer ID, and GPI 2 may be a network ID assigned by a PLMN ID. 'physPointId' specifies the physical layer ID of a reference point, and 'pointGlobalId' specifies a unique ID (network ID) of a reference point in the entire system. 'earfcnRef' specifies an EARFCN of a reference point. 'antennaPortConfig' represents which one of antenna ports 1, 2, and 4 is used for a point-specific reference signal. 'cpLength' specifies the CP length of a reference point PRS. 'prsInfo' specifies a PRS configuration of a reference point.

Further, information on neighbor cells (OTDOA-NeighbourCellInfoList) as shown in Table 7 may be changed to information on neighbor points (OTDOA-NeighbourPointInforlist). By way of example, information on neighbor points may be given as shown in Table 11:

TABLE 11

```
-- ASN1START
OTDOA-NeighbourPointInfoList ::= SEQUENCE (SIZE (1 . . . maxFreqLayers)) OF
OTDOA-
NeighbourFreqInfo
OTDOA-NeighbourFreqInfo ::= SEQUENCE (SIZE (1 . . . 24)) OF OTDOA-
NeighbourPointInfoElement
OTDOA-NeighbourPointInfoElement ::= SEQUENCE {
    physPointId        GPI1
    pointGlobalId      GPI2              OPTIONAL,         --Need ON
    earfcn             ARFCN-ValueEUTRA OPTIONAL,          -- Cond NotSameAsRef0
    cpLength           ENUMERATED {normal extended, . . . }
                                         OPTIONAL,         -- Cond NotSameAsRef1
    prsInfo            PRS-Info          OPTIONAL,         --Cond NotSameAsRef2
    antennaPortConfig  ENUMERATED {ports-1-or-2, ports-4, . . . }
                                         OPTIONAL,         -- Cond NotSameAsRef3
    slotNumberOffset   INTEGER(0 . . . 31)  OPTIONAL,      -- Cond NotSameAsRef4
    prs-SubframeOffset INTEGER (0 . . .                    -- Cond InterFreq
                       1279)   OPTIONAL,
```

TABLE 11-continued

```
    expectedRSTD      INTEGER (0 ... 16383),
    expeetedRSTD-Uncertainty     INTEGER (0 ... 1023),
    ...
}
maxFreqLayers INTEGER ::= 3
-- ASN1STOP
```

'physPointId' specifies a neighbor point's GPI, and 'pointGlobalId' specifies a unique ID (network ID) of a neighbor point in the entire system. 'earfcnRef' specifies an EARFCN of a neighbor point. 'cpLength' specifies the CP length of a neighbor point PRS. 'prsInfo' specifies a PRS configuration of a neighbor point. 'antennaPortConfig' indicates which one of antenna ports 1, 2, and 4 is used for a point-specific reference signal. 'slotNumberOffset' specifies a slot number offset between a neighbor point and a reference point. 'prs-SubframeOffset' specifies an offset between the first PRS subframe at a reference carrier frequency layer of a reference point and the first PRS subframe at a carrier frequency layer of another point. 'expectedRSTD' indicates an RSTD value expected to be measured between a neighbor point and a reference point in a target device. 'expectedRSTD-Uncertainty' indicates uncertainty of an 'expectedRSTD' value.

Further, as an example, the OTDOA signal measurement information (OTDOA-SignalMeasurementInformation) reported to the base station by the terminal, as described in connection with Table 8 may be changed as shown in Table 12.

TABLE 12

```
-- ASN1START
OTDOA-SignalMeasurementInformation ::= SEQUENCE {
    systemFrameNumber       BIT STRING (SIZE (10)),
    physPointIdRef          GPI1,
    pointGlobalIdRef        GPI2                OPTIONAL,
    earfcnRef               ARFCN-ValueEUFRA    OPTIONAL,
    referenceQuality        OTDOA-MeasQuality   OPTIONAL,
    neighbourMeasurementList NeighbourMeasurementList,
    ...
}
NeighbourMeasurementList ::= SEQUENCE (SIZE(1 ... 24)) OF NeighbourMeasurementElement
NeighbourMeasurementElement ::= SEQUENCE {
    physPointIdNeighbor     GPI1,
    pointGlobalIdNeighbour  GPI2                OPTIONAL,
    earfcnNeighbour         ARFCN-ValueEUTRA    OPTIONAL,
    rstd           INTEGER (0 ... 12711),
    rstd-Quality           OTDOA-MeasQuality,
    ...
}
-- ASN1STOP
```

'systemFrameNumber' specifies the number of a system frame where the last measurement has been conducted. 'physPointIdRef' specifies a GPI of a related reference point where RSTDs are provided. 'pointGlobalIdRef' represents a unique ID (network ID) of a related reference point where RSTDs are provided. 'earfcnRef' specifies an E-UTRA carrier frequency of a reference point, used for RSTD measurement. 'referenceQuality' represents the best estimation quality of a signal arrival time measurement from a reference point used for calculating an RSTD value. 'neighborMeasurementList' is a list including measured RSTD values and quality of the measurement. 'physPointIdNeighbor' specifies the GPIs of neighbor points where RSTDs are provided. 'pointGlobalIdNeighbour' specifies unique IDs (network IDs) of neighbor points where RSTDs are provided. 'earfcnNeighbor' specifies E-UTRA carrier frequencies of neighbor points used for RSTD measurement. 'rstd' specifies a relative time difference between a reference point and a neighbor point. 'rstd-Qualiity' specifies the best estimation of a device with respect to the measured rstd quality.

Further, the cell-based defined RSTD may be changed to be point-based in view of its definition. In other words, the RSTD may be defined as a time difference between when the terminal receives the start of a subframe from a neighbour point and when the terminal receives the start of a subframe closest to the subframe from the reference point.

As described above, a point ID (GPI) may replace a physical cell ID. Upon PRS generation, in case a physical cell ID and a point ID are both used (for example, in case a PRS sequence is generated with a physical cell ID, and a frequency shift is determined with a point ID), the physical cell ID and the point ID both may be included in IEs.

In the above-described methods, the existing cell-specifically defined PRS is changed to be point-specific, and the point ID is accordingly included in a control signal transferred by the base station to the terminal, and methods that are used even for signals sent from the terminal to the base station have been described. Hereinafter, a method of positioning a terminal is described without changing the existing cell-specifically defined PRS and control signal.

In this method, different points in one cell transmit PRSs using different physical cell IDs (PCIs). In other words, the different points in the cell operate like different cells. At this time, in some points, the PCI used for PRS transmission may differ from the PCI used for transmission of other physical channel signals, for example, CRS, synchronization signal, and PDCCH.

Figure 12:
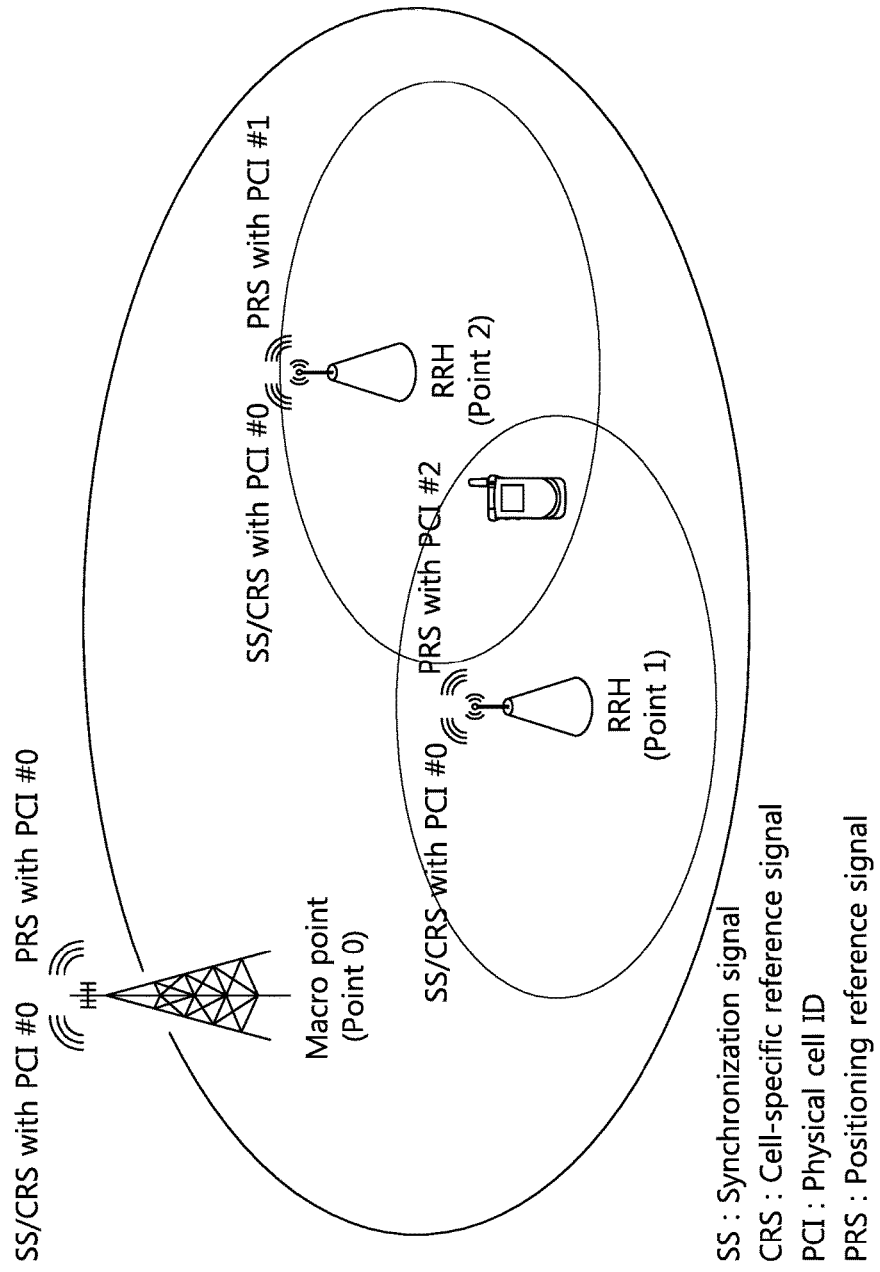
FIG. 12 shows a method of operating points according to an embodiment of the present invention.

FIG. 12 shows a method of operating points according to an embodiment of the present invention.

Referring to FIG. 12, the macro point transfers a synchronization signal, a CRS, and a PRS using PCI #0. In contrast, point 1 sends a synchronization signal and a CRS using PCI #0 and sends a PRS using PCI #2. Point 2 sends a synchronization signal and a CRS using PCI #0 and sends a PRS using PCI #1.

That is, the cell ID for PRS transmission at each point may be set to be different from the physical cell ID of the cell where the point is included. The base station may configure PCI #0 using control information 'OTDOA-ReferenceCellInfo' to the terminal and may configure PCI #1 and PCI #2 through 'OTDOA-NeighbourCellInfoList'. The terminal receives PRSs corresponding to the cell IDs and reports corresponding RSTDs.

Meanwhile, in a single cell multi-node system, different points may use the same physical cell and different PRS configuration indexes $I_{PRS}$. That is, the macro node may configure different PRS configuration indexes for their respective points. Using different PRS configuration indexes means that the points send PRSs mapped with different times and frequency physical resources.

As described earlier, sequences used as PRSs are generated based on physical cell IDs and then are mapped with specific resource elements in the subframe. At this time, the sub frame where the PRS is transferred and period may be set variously by the PRS configuration index $I_{PRS}$. Using this, different PRS configuration indexes $I_{PRS}$ are configured to send a distinct PRS per point.

In case such method is used, the physical cell ID provided through 'OTDOA-ReferenceCellInfo' and the physical cell ID used by a neighbour node for PRS transmission are the same, thus eliminating the need of separately signalling the physical cell ID of the neighbour node. Accordingly, the PCI field may be omitted from 'OTDOA-NeighbourCellInfoList'.

'OTDOA-NeighbourCellInfoList' is used for the location server to offer neighbour cell information for OTDOA auxiliary data. 'OTDOA-NeighbourCellInfoList' provides a list obtained by sorting in descending order priorities of measurement that should be conducted by the terminal, and the first cell in the list has the highest priority. The terminal provides possible measurement in the order provided by the location server.

The following table shows an example of 'OTDOA-NeighbourCellInfoList'.

Each field in Table 13 may be included or excluded depending on the conditions shown in Table 14.

TABLE 14

| Conditional presence | Explanation |
| --- | --- |
| NotsameAsRef0 | The field is mandatory present if the EARFCN is not the same as for the reference cell; otherwise it is not present. |
| NotsameAsRef1 | The field is mandatory present if the cyclic prefix length is not the same as for the reference cell; otherwise it is not present. |
| NotsameAsRef2 | The field is mandatory present if the PRS configuration is not the same as for the reference cell; otherwise it is not present. |
| NotsameAsRef3 | The field is mandatory present if the antenna port configuration is not the same as for the reference cell; otherwise it is not present.) |
| NotsameAsRef4 | The field is mandatory present if the slot timing is not the same as for the reference cell; otherwise it is not present. |
| InterFreq | The field is optionally present, need OP, if the EARFCN is not the same as for the reference cell; otherwise it is not present. |
| NotsameAsRef5 | The field is mandatory present if the physical cell ID is not the same as for the reference cell; otherwise it is not present. |

Further, applying the method described in connection with FIG. 12 may allow the cell ID for a neighbor node to be omitted upon RSTD feedback.

The following table shows an example of 'OTDOA-SignalMeasurementInformation' when applying the method described in connection with FIG. 12.

TABLE 13

```
-- ASN1START
OTDOA-NeighbourCellInfoList ::= SEQUENCE (SIZE (1 . . . maxFreqLayers)) OF OTDOA-
NeighbourFreqInfo
OTDOA-NeighbourFreqInfo ::= SEQUENCE (SIZE (1 . . . 24)) OF OTDOA-
NeighbourCellInfoElement
OTDOA-NeighbourCellInfoElement ::= SEQUENCE {
    physCellId        INTEGER (0 . . . 503)      OPTIONAL,      -- Cond NotSameAsRef5
    cellGlobalId                  ECGI           OPTIONAL,      -- Need ON
    earfcn                        ARFCN-ValueEUTRA OPTIONAL,    -- Cond NotSameAsRef0
    cpLength                      ENUMERATED {normal extended, . . . }
                                                 OPTIONAL,     -- Cond NotSazneAsRef1
    prsInfo                       PRS-Info       OPTIONAL,      -- Cond NotSameAsRef2
    antennaPortConfig             ENUMERATED {ports-1-or-2, ports-4, . . . }
                                  OPTIONAL,                    --Cond NotsameAsRef3
    slotNumberOffset              INTEGER(0 . . . 31)  OPTIONAL,  -- Cond NotSameAsRef4
    prs-SubframeOffset            INTEGER (0 . . .                -- Cond InterFreq
                                  1279)   OPTIONAL,
    expectedRSTD                  INTEGER (0 . . . 16383),
    expectedRSTD-Uncertainty      INTEGER (0 . . . 1023),
    . . .
}
maxFreqLayers INTEGER ::= 3
-- ASN1STOP
```

TABLE 15

```
-- ASN1START
OTDOA-SignalMeasurementInformation ::= SEQUENCE {
    systemFrameNumber            BIT STRING (SIZE 10)),
    physCellIdRef                INTEGER (0 . . . 503),
    cellGlobalIdRef              ECGI                    OPTIONAL,
    earfcnRef                    ARFCN-ValueEUTRA        OPTIONAL,
    referenceQuality             OTDOA-MeasQuality       OPTIONAL,
    neighbourMeasurementList NeighbourMeasurementList,
    . . .
}
NeighbourMeasurementList ::= SEQUENCE SIZE(1 . . . 24)) OF NeighbourMeasurementElement
NeighbourMeasurementElement ::= SEQUENCE {
    physCellIdNeighbor           INTEGER (0 . . . 503)     OPTIONAL,
    cellGlobalIdNeighbour ECGI                    OPTIONAL,
    earfcnNeighbour              ARFCN-ValueEUTRA OPTIONAL,
    rstd                         INTEGER (0 . . . 12711),
    rstd-Quality                 OTDOA-MeasQuality,
. . .
}
-- ASN1STOP
```

In the multi-node system, the node density is evolving to increase. In this case, the reference cell/reference point and neighbor cell/neighbor point should be updated more frequently depending on the location of the terminal. Further, according to the distribution of the dense nodes, a change in RSTD depending on the terminal's movement may be made more sensitively.

Figure 13:
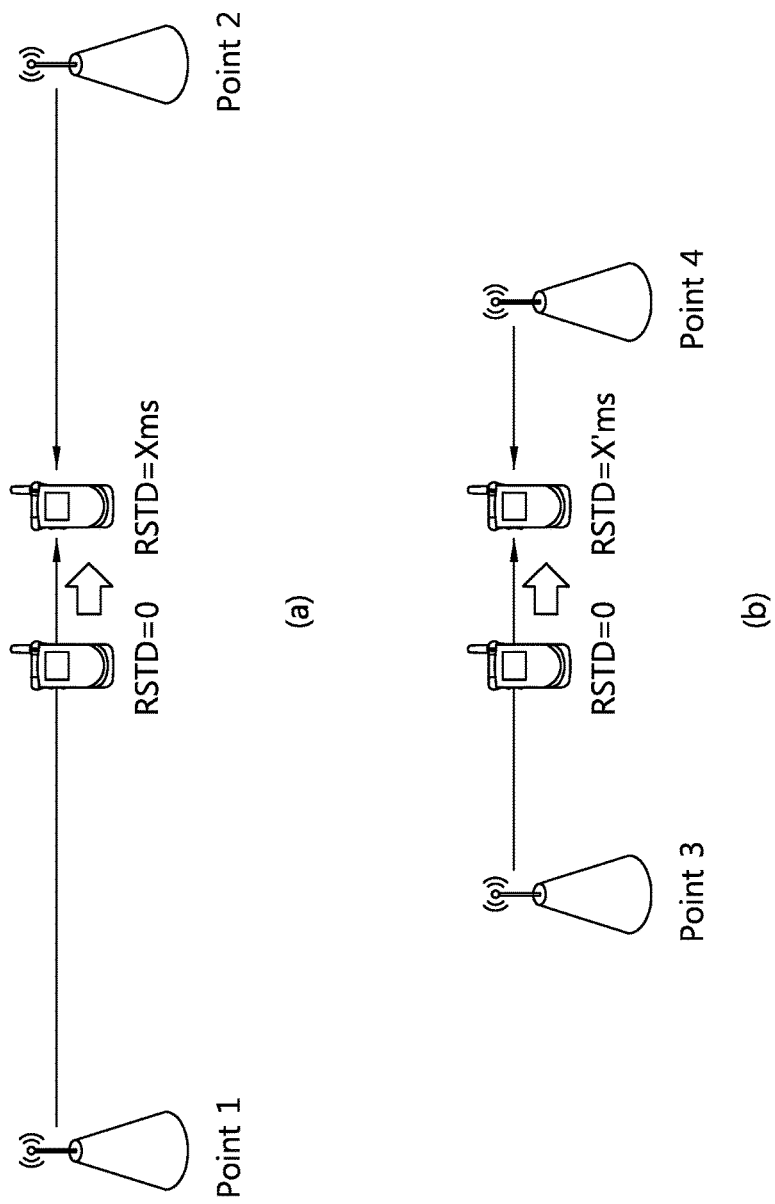
FIG. 13 shows an example of comparison in RSTD sensitivity depending on node density in a multi-node system.

FIG. 13 shows an example of comparison in RSTD sensitivity depending on node density in a multi-node system.

In FIG. 13(a), points 1 and 2 are arranged to be wider than points 3 and 4 are in FIG. 13(b). A change in RSTD when the terminal approaches point 4 from the middle between points 3 and 4 is larger than a change in RSTD when the terminal approaches point 2 from the middle between points 1 and 2 because the distance between points 3 and 4 is shorter than the distance between points 1 and 2 so that points 3 and 4 may react more sensitively to the same relocation of the terminal.

In other words, as the density of points in the multi-node system increases, more frequent signaling is needed to more precisely locate the terminal. In the existing communication standards, an OTDOA is defined in RRC layer (layer 3). Accordingly, the period of reporting an RSTD measurement result cannot but be long.

To address this, the terminal may include an RSTD measurement result in UCI (uplink control information) that is physical layer (layer 1) feedback information or send it as MAC layer (layer 2) feedback information. For this, the terminal needs to specify that an RSTD measurement result be reported in a lower layer (i.e., layer 1 or 2). For example, an RSTD is included in the UCI like CQI, PMI or RI and is transmitted through a PUCCH/PUSCH. In case a PUCCH is used, a new PUCCH format including an RSTD may be defined, and in case a PUSCH is used, an RSTD may be transferred, piggybacked on uplink data. Further, the base station may also send control information for scheduling reporting an RSTD measurement result through a physical layer signal or an MAC layer signal.

Figure 14:
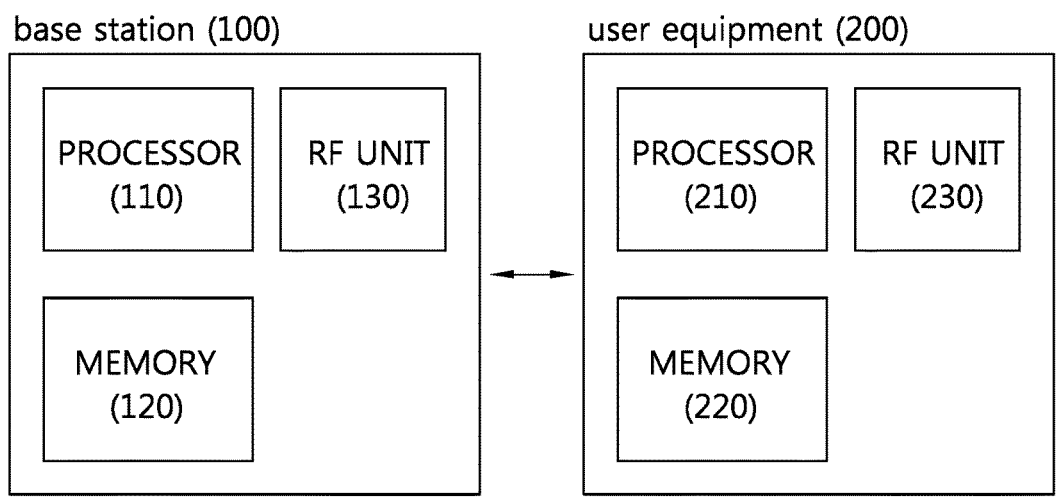
FIG. 14 is a block diagram illustrating a base station and a terminal.

FIG. 14 is a block diagram illustrating a base station and a terminal.

The base station 100 includes a processor 110, a memory 120, and an RF (radio frequency) unit 130. The processor 110 implements a function, process, and/or method as suggested herein. The processor 110 configures GPIs for a plurality of nodes, i.e., points, connected via fiber optic and enables PRSs to be sent using the GPIs. Further, the processor 110 estimates/detects the location of a terminal using per-node channel information fed back from the terminal. The channel information may be the above-described RSRP, RSRQ, UE Rx-Tx time difference, and RSTD and is node-specific. When a positioning method such as OTDOA applies, the processor 110 provides necessary higher layer control signals, e.g., information such as 'OTDOA-ReferencePointInfo','OTDOA-NeighbourPointInfoList,' point-based, but not cell-based. The memory 120 is connected with the processor 110 and stores various pieces of information for driving the processor 110. The RF unit 130 is connected with the processor 110 and transmits and/or receives radio signals. The RF unit 130 may consist of a plurality of nodes wiredly connected with the base station 100.

The terminal 200 includes a processor 210, a memory 220, and an RF unit 230. The processor 210 performs a function and a method as described above. For example, the processor 210 receives configuration of per-node GPI through a higher level signal such as an RRC message from the base station. The GPI may be used for a PRS and is a cell ID that adds to an existing cell ID such as a physical cell ID or ECGI or is a replacement cell ID. Further, the processor 210 may generate per-node channel information using the PRS and fed it back to the base station or a specific node. The multi-node system may more precisely locate the terminal through such channel information because the location of the terminal may be grasped on an in-cell point basis but not on a cell basis. The memory 220 is connected with the processor 210 and stores various pieces of information for driving the processor 210. The RF unit 230 is connected with the processor 210 and transmits and/or receives radio signals.

The processor 110 or 210 may include an ASIC (application-specific integrated circuit), other chipset, a logic circuit, a data processing device and/or a converter that mutually converts a baseband signal and a radio signal. The memory 120 or 220 may include an ROM (read-only memory), an RAM (random access memory), a flash memory, a memory card, a storage medium and/or other storage device. The RF unit 130 or 230 may include one or more antennas for transmitting and/or receiving radio signals. When an embodiment is implemented in software, the above-described schemes may be realized in modules (processes, functions, etc.) for performing the above-described operations. The modules may be stored in the memory 120 or 220 and may be executed by the processor 110 or processor 210. The memory 120 or 220 may be positioned in or outside the processor 110 or 210 and may be connected with the processor 110 or 210 via various known means.

The present invention may be implemented in hardware, software, or a combination thereof. When implemented in hardware, the hardware may be realized in an ASIC (application specific integrated circuit), DSP (digital signal processing), PLD (programmable logic device), FPGA (field programmable gate array), processor, controller, microprocessor, other electronic unit or a combination thereof, which is designed to conduct the above-described functions. When implemented in software, the software may be realized in modules for performing the above-described functions. The software may be stored in a memory unit and may be executed by a processor. The memory unit or processor may adopt various means known to one of ordinary skill in the art.

What is claimed is:

1. A method of transmitting reference signal time difference (RSTD) information in a multi-node system, which includes a base station (BS), a reference node and a neighbor node, the method performed by a user equipment (UE) and comprising:
   receiving, from the BS, reference cell information and neighbor cell information;
   receiving, from the BS, reference node information and neighbor node information;
   generating cell RSTD information based on the reference cell information and the neighbor cell information,
   wherein the cell RSTD information is information for a relative timing difference between a reference cell identified by the reference cell information and a neighbor cell identified by the neighbor cell information;
   generating node RSTD information based on the reference node information and the neighbor node information,
   wherein the node RSTD information is information for a relative timing difference between the reference node identified by the reference node information and the neighbor node identified by the neighbor node information; and
   transmitting, to the BS, the cell RSTD information and the node RSTD information,
   wherein the cell RSTD information is transmitted via a radio resource control (RRC) layer, and the node RSTD information is transmitted via a lower layer which is lower than the RRC layer,
   wherein the node RSTD information is included in uplink control information (UCI) when the node RSTD information is transmitted via the lower layer, and
   wherein the node RSTD information is transmitted more frequently than the cell RSTD information.

2. The method of claim 1, wherein the node RSTD information included in the UCI is piggybacked when the UCI is transmitted on a physical uplink shared channel (PUSCH).

3. The method of claim 1, wherein the UE receives control information scheduling a transmission for the node RSTD information from the BS.

4. A user equipment (UE) in a multi-node system, which includes a base station (BS), a reference node and a neighbor node, the UE comprising:
   a radio frequency (RF) unit configured to transmit and receive a radio signal; and
   a processor connected with the RF unit,
   wherein the processor is configured to:
      control the RF unit to receive, from the BS, reference cell information and neighbor cell information,
      control the RF unit to receive, from the BS, reference node information and neighbor node information,
      generate cell RSTD information based on the reference cell information and the neighbor cell information,
      wherein the cell RSTD information is information for a relative timing difference between a reference cell identified by the reference cell information and a neighbor cell identified by the neighbor cell information,
      generate node RSTD information based on the reference node information and the neighbor node information,
      wherein the node RSTD information is information for a relative timing difference between the reference node identified by the reference node information and the neighbor node identified by the neighbor node information, and
      control the RF unit to transmit, to the BS, the cell RSTD information and the node RSTD information,
   wherein the cell RSTD information is transmitted via a radio resource control (RRC) layer, and the node RSTD information is transmitted via a lower layer which is lower than the RRC layer,
   wherein the node RSTD information is included in uplink control information (UCI) when the node RSTD information is transmitted via the lower layer, and
   wherein the node RSTD information is transmitted more frequently than the cell RSTD information.

5. The UE of claim 4, wherein the node RSTD information included in the UCI is piggybacked when the UCI is transmitted on a physical uplink shared channel (PUSCH).

6. The UE of claim 4, wherein the UE receives control information scheduling a transmission for the node RSTD information from the BS.

\* \* \* \* \*